US012695532B2

(12) United States Patent
Zhang et al.

(10) Patent No.: US 12,695,532 B2
(45) Date of Patent: Jul. 28, 2026

(54) CLOCK SOURCE SELECTION METHOD, APPARATUS, AND SYSTEM, AND STORAGE MEDIUM

(71) Applicant: Huawei Technologies Co., Ltd., Shenzhen (CN)

(72) Inventors: Yawei Zhang, Beijing (CN); Jingfei Lyu, Wuhan (CN); Jianwu Hao, Beijing (CN); Songyan Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 18/521,826

(22) Filed: Nov. 28, 2023

(65) Prior Publication Data

US 2024/0097812 A1    Mar. 21, 2024

Related U.S. Application Data

(63) Continuation of application No. PCT/CN2022/092359, filed on May 12, 2022.

(30) Foreign Application Priority Data

Jun. 28, 2021   (CN) .......................... 202110718819.1

(51) Int. Cl.
*H04J 3/06*          (2006.01)

(52) U.S. Cl.
CPC .......... *H04J 3/0667* (2013.01); *H04J 3/0685* (2013.01)

(58) Field of Classification Search
None
See application file for complete search history.

(56) References Cited

U.S. PATENT DOCUMENTS

| | | | | |
|---|---|---|---|---|
| 2013/0227172 A1* | 8/2013 | Zheng | ................... | H04J 3/0667 709/248 |
| 2019/0116021 A1* | 4/2019 | Tanwar | ................ | H04J 3/0673 |
| 2020/0413360 A1* | 12/2020 | Ruffini | .............. | H04W 56/0015 |

FOREIGN PATENT DOCUMENTS

| | | |
|---|---|---|
| CN | 101399655 A | 4/2009 |
| CN | 103490840 A | 1/2014 |
| CN | 107046449 A | 8/2017 |

* cited by examiner

*Primary Examiner* — Diane L Lo
(74) *Attorney, Agent, or Firm* — Slater Matsil, LLP

(57)        ABSTRACT

After a first network device traces a clock of a second network device, when the first network device cannot trace the clock of the second network device, the first network device modifies a parameter value corresponding to a synchronization source selection parameter of the first network device to a first parameter value, where the first parameter value is superior to a parameter value corresponding to a synchronization source selection parameter of the second network device.

20 Claims, 8 Drawing Sheets

300

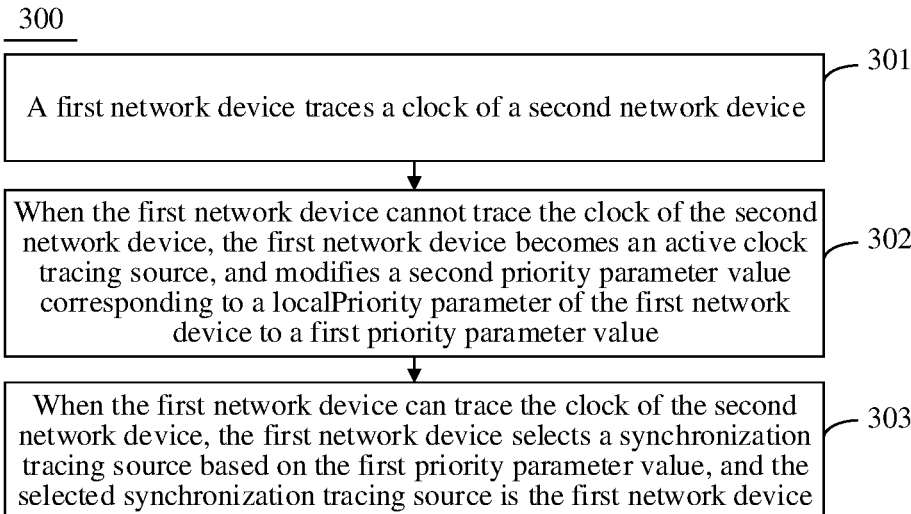

301

A first network device traces a clock of a second network device

302

When the first network device cannot trace the clock of the second network device, the first network device becomes an active clock tracing source, and modifies a second priority parameter value corresponding to a localPriority parameter of the first network device to a first priority parameter value

303

When the first network device can trace the clock of the second network device, the first network device selects a synchronization tracing source based on the first priority parameter value, and the selected synchronization tracing source is the first network device

CLOCK SOURCE SELECTION METHOD, APPARATUS, AND SYSTEM, AND STORAGE MEDIUM

CROSS-REFERENCE TO RELATED APPLICATIONS

This application is a continuation of International Application No. PCT/CN2022/092359, filed on May 12, 2022, which claims priority to Chinese Patent Application No. 202110718819.1, filed on Jun. 28, 2021. The disclosures of the aforementioned applications are hereby incorporated by reference in their entireties.

TECHNICAL FIELD

This application relates to the communications field, and in particular, to a clock source selection method, apparatus, and system, and a storage medium.

BACKGROUND

With the development of network technologies, a high requirement is put forward for detection precision of a network delay. For example, for any two network devices in a network, if a one-way delay between the two network devices needs to be measured, clocks of the two network devices need to be synchronized.

To enable clocks of network devices in a network to be synchronized, currently, two network devices are selected as synchronization tracing sources in the network. For the two synchronization tracing sources, one is an active synchronization tracing source, and the other is a standby synchronization tracing source. When the active synchronization tracing source is normal, the standby synchronization tracing source and other network devices in the network than the two network devices trace the active synchronization tracing source, so that clocks of all network devices in the network are synchronized. When the active synchronization tracing source is faulty, the other network devices trace the standby synchronization tracing source, so that the clocks of the network devices in the network continue to be synchronized.

In a process of implementing this application, the inventor finds that the conventional technology has at least the following problems.

If the active synchronization tracing source returns to normal, the standby synchronization tracing source and the other network devices re-trace the active synchronization tracing source. When the active synchronization tracing source returns to normal, a clock of the active synchronization tracing source is reset, and the network devices in the network trace the active synchronization tracing source. Consequently, the clocks of the network devices jump.

SUMMARY

This application provides a clock source selection method, apparatus, and system, and a storage medium, to prevent a clock of a network device from jumping. The technical solutions are as follows.

According to a first aspect, this application provides a clock source selection method. In the method, after a first network device traces a clock of a second network device, when the first network device cannot trace the clock of the second network device, the first network device modifies a parameter value corresponding to a synchronization source selection parameter of the first network device to a first parameter value, where the first parameter value is superior to a parameter value corresponding to a synchronization source selection parameter of the second network device.

When the first network device can trace the second network device, the clock of the second network device may be reset, and a network device in a network performs a clock source selection operation. For the first network device, because the first parameter value is superior to the parameter value corresponding to the synchronization source selection parameter of the second network device, when performing clock source selection based on the first parameter value and the parameter value corresponding to the synchronization source selection parameter of the second network device, the first network device continues to select the first network device as a synchronization tracing source, to prevent the first network device from tracing the second network device, and prevent a clock of the first network device from jumping.

In addition, because the first parameter value is superior to the parameter value corresponding to the synchronization source selection parameter of the second network device, when performing clock source selection, the second network device also selects to trace the first network device, so that the clock of the second network device is synchronized with the clock of the first network device.

For a third network device other than the first network device and the second network device in the network, when the first network device cannot trace the clock of the second network device, the third network device selects to trace the clock of the first network device. When the first network device can trace the second network device, the third network device performs clock source selection, and may continue to select the first network device as the synchronization tracing source, to prevent a clock of the third network device from jumping, or may select the second network as the synchronization tracing source. However, because the clock of the second network device is synchronized with the clock of the first network device, a jump of the clock of the third network device is avoided.

In a possible implementation, the synchronization source selection parameter of the first network device includes a local priority localPriority parameter of the first network device, and the first parameter value includes a first priority parameter value. The first network device modifies a second priority parameter value corresponding to the localPriority parameter of the first network device to the first priority parameter value. In this way, the parameter value corresponding to the localPriority parameter of the first network device is modified, so that when the first network device can trace the second network device, the first network device can continue to be used as the synchronization tracing source, to prevent a clock of the network device in the network from jumping.

In another possible implementation, the second priority parameter value is inferior to a priority parameter value corresponding to a localPriority parameter of a first port, and the first port is a port that is on the first network device and that is for communicating with the second network device.

In another possible implementation, the first priority parameter value is superior to the priority parameter value corresponding to the localPriority parameter of the first port, and the first port is the port that is on the first network device and that is for communicating with the second network device. In this way, because the first priority parameter value is superior to the priority parameter value corresponding to the localPriority parameter of the first port, it is ensured that the first network device is selected as the synchronization tracing source when the first network device performs clock source selection.

In another possible implementation, the second priority parameter value is equal to a priority parameter value corresponding to a localPriority parameter of the second network device.

In another possible implementation, the first network device selects the synchronization tracing source based on the first priority parameter value. This ensures that the first network device can select the first network device as the synchronization tracing source based on the first priority parameter value.

In another possible implementation, when receiving a packet from the second network device through the first port, the first network device compares the first priority parameter value with the priority parameter value corresponding to the localPriority parameter of the first port, where the first port is the port that is on the first network device and that is for communicating with the second network device. When determining by comparison that the first priority parameter value is superior to the priority parameter value corresponding to the localPriority parameter of the first port, the first network device selects the first network device as the synchronization tracing source. In this way, that the first network device traces the clock of the second network device is avoided, and a jump of the clock of the first network device is avoided.

In another possible implementation, the synchronization source selection parameter of the first network device includes a clock quality parameter of the first network device, and the first parameter value includes a first clock quality parameter value. The first network device modifies a clock quality parameter value corresponding to the clock quality parameter of the first network device to the first clock quality parameter value. In this way, the clock quality parameter value corresponding to the clock quality parameter of the first network device is modified, so that when the first network device can trace the second network device, the network device in the network can continue to select the first network device as the synchronization tracing source, to prevent the clock of the network device in the network from jumping.

In another possible implementation, the clock quality parameter of the first network device includes one or more of a clock class, clock accuracy, and an offset scaled log variance of the first network device.

In another possible implementation, the first network device selects the synchronization tracing source based on the first clock quality parameter value. This ensures that the first network device can select the first network device as the synchronization tracing source based on the first clock quality parameter value.

In another possible implementation, the first network device receives a notification packet sent by the second network device, where the notification packet includes a second clock quality parameter value, and the second clock quality parameter value is a clock quality parameter value corresponding to a clock quality parameter of the second network device. When the first clock quality parameter value is superior to the second clock quality parameter value, the first network device selects the first network device as the synchronization tracing source. In this way, that the first network device traces the clock of the second network device is avoided, and a jump of the clock of the first network device is avoided.

In another possible implementation, there are one or more synchronization source selection parameters of the first network device.

According to a second aspect, this application provides a clock source selection method. In the method, a network device adjusts a default value of a local priority localPriority parameter of the network device to be inferior to a default value of a localPriority parameter value of a port of the network device. The network device performs clock source selection based on an adjusted default value of the localPriority parameter of the network device and the default value of the localPriority parameter value of the port of the network device.

Because the default value of the localPriority parameter of the network device is adjusted to be inferior to the default value of the localPriority parameter value of the port of the network device, during clock source selection, an existing active synchronization tracing source in the network is selected to be traced, and a clock of the active synchronization tracing source is traced, to prevent a clock of the network device in a network from jumping.

In a possible implementation, the network device includes a plurality of ports, and default values of localPriority parameter values of the plurality of ports are the same.

In another possible implementation, the network device sends a notification packet after performing clock source selection, where the notification packet includes a parameter value of a synchronization source selection parameter of the network device. After the network device performs clock source selection, the clock of the network device has been synchronized with a clock of the active synchronization tracing source. Therefore, the network device sends the notification packet after performing clock source selection, and when another network device selects to trace the clock of the network device, a clock of the another network device does not jump.

According to a third aspect, this application provides a clock source selection method. In the method, after a first network device traces a first clock source, when the first network device cannot trace the first clock source, the first network device sets a state of a first port to a monitoring state, where the first port is a port that is on the first network device and that is for communicating with the first clock source, and the first port in the monitoring state does not participate in clock source selection. When the first network device can trace the first clock source, the state of the first port keeps in the monitoring state.

After the first network device cannot trace the first clock source, when the first network device can trace the first clock source again, the state of the first port is kept in the monitoring state. Because the first port in the monitoring state does not participate in clock source selection, the first network device does not switch a traced clock source back to the first clock source. This reduces a frequency of switching the clock source and improves network stability.

In a possible implementation, the first network device traces a second clock source.

In another possible implementation, after the first network device traces the second clock source and when the first network device cannot trace the second clock source, the first network device sets the state of the first port to be recovered to a non-monitoring state, where the first port in the non-monitoring state participates in clock source selection. In this way, the first network device switches the traced clock source back to the first clock source only when the first network device cannot trace the second clock source. This reduces a frequency of switching the clock source and improves network stability.

According to a fourth aspect, this application provides a clock source selection apparatus, configured to perform the method in any one of the first aspect or the possible implementations of the first aspect. Specifically, the apparatus includes units configured to perform the method in any one of the first aspect or the possible implementations of the first aspect.

According to a fifth aspect, this application provides a clock source selection apparatus, configured to perform the method in any one of the second aspect or the possible implementations of the second aspect. Specifically, the apparatus includes units configured to perform the method in any one of the second aspect or the possible implementations of the second aspect.

According to a sixth aspect, this application provides a clock source selection apparatus, configured to perform the method in any one of the third aspect or the possible implementations of the third aspect. Specifically, the apparatus includes units configured to perform the method in any one of the third aspect or the possible implementations of the third aspect.

According to a seventh aspect, this application provides a clock source selection apparatus, including a processor and a memory. The processor and the memory may be connected through an internal connection. The memory is configured to store a program, and the processor is configured to execute the program in the memory, to enable the apparatus to complete the method according to any one of the first aspect or the possible implementations of the first aspect.

According to an eighth aspect, this application provides a clock source selection apparatus, including a processor and a memory. The processor and the memory may be connected through an internal connection. The memory is configured to store a program, and the processor is configured to execute the program in the memory, to enable the apparatus to complete the method according to any one of the second aspect or the possible implementations of the second aspect.

According to a ninth aspect, this application provides a clock source selection apparatus, including a processor and a memory. The processor and the memory may be connected through an internal connection. The memory is configured to store a program, and the processor is configured to execute the program in the memory, to enable the apparatus to complete the method according to any one of the third aspect or the possible implementations of the third aspect.

According to a tenth aspect, this application provides a computer program product. The computer program product includes a computer program stored in a computer-readable storage medium, and the computer program is loaded by a processor to implement the method according to any one of the first aspect, the second aspect, the third aspect, the possible implementations of the first aspect, the possible implementations of the second aspect, or the possible implementations of the second aspect.

According to an eleventh aspect, this application provides a computer-readable storage medium, configured to store a computer program, and the computer program is loaded by a processor to execute the method according to any one of the first aspect, the second aspect, the third aspect, the possible implementations of the first aspect, the possible implementations of the second aspect, or the possible implementations of the third aspect.

According to a twelfth aspect, this application provides a chip, including a memory and a processor. The memory is configured to store computer instructions, and the processor is configured to invoke the computer instructions from the memory and run the computer instructions, to perform the method according to any one of the first aspect, the second aspect, the third aspect, the possible implementations of the first aspect, the possible implementations of the second aspect, or the possible implementations of the third aspect.

According to a thirteenth aspect, this application provides a clock source selection system. The system includes the apparatus according to the fourth aspect and the apparatus according to the fifth aspect, or the system includes the apparatus according to the seventh aspect and the apparatus according to the eighth aspect.

BRIEF DESCRIPTION OF THE DRAWINGS

FIG. 3 is a flowchart of a clock source selection method according to an embodiment of this application;

DETAILED DESCRIPTION OF ILLUSTRATIVE EMBODIMENTS

The following describes implementations of this application in detail with reference to the accompanying drawings.

Figure 1:
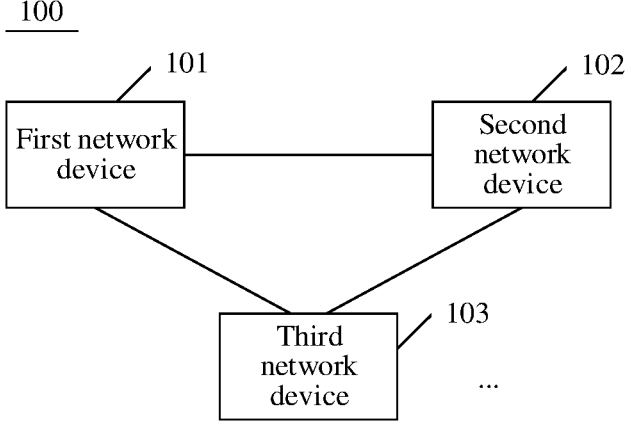
FIG. 1 is a schematic diagram of a network architecture according to an embodiment of this application.

Refer to FIG. 1. An embodiment of this application provides a network architecture 100, including: a first network device 101 and a second network device 102, where the first network device 101 communicates with the second network device 102. The first network device 101 traces a clock of the second network device 102.

That the first network device 101 traces the clock of the second network device 102 means that the first network device 101 synchronizes time of the first network device 101 with time of the second network device 102, and/or the first network device 101 synchronizes a frequency of the first network device 101 with a frequency of the second network device 102.

In some embodiments, the second network device 102 is an active synchronization tracing source, and the first network device 101 is a standby synchronization tracing source. Therefore, when selecting a synchronization tracing source, the first network device 101 selects the second network device 102 as the synchronization tracing source, and traces the clock of the second network device 102.

Refer to FIG. 1. The network architecture 100 further includes at least one third network device 103. For any one of the at least one third network device 103, the third network device communicates with the first network device 101, and the third network device communicates with the second network device 102.

Because the first network device 101 is the standby synchronization tracing source, and the second network device 102 is the active synchronization tracing source, the third network device selects the second network device 102 as the synchronization tracing source, and traces the clock of the second network device 102.

The first network device 101 includes at least one synchronization source selection parameter.

The at least one synchronization source selection parameter of the first network device 101 includes a local priority (localPriority) parameter, at least one first clock parameter, and/or the like. The at least one synchronization source selection parameter is a parameter of a clock of the first network device 101.

In some embodiments, a larger priority parameter value corresponding to the localPriority parameter indicates a superior priority parameter value corresponding to the local-Priority parameter, or a smaller priority parameter value corresponding to the localPriority parameter indicates a superior priority parameter value corresponding to the local-Priority parameter.

The first network device 101 includes at least one port, and each port also includes a localPriority parameter. A default value corresponding to the localPriority parameter of the first network device 101 is inferior to a default value corresponding to the localPriority parameter of each port. For ease of description, the default value corresponding to the localPriority parameter of the first network device 101 is referred to as a second priority parameter value, to be specific, the second priority parameter value is inferior to the default value corresponding to the localPriority parameter of each port.

For example, it is assumed that a smaller priority parameter value corresponding to the localPriority parameter indicates a superior priority parameter value corresponding to the localPriority parameter, the second priority parameter value corresponding to the localPriority parameter of the first network device 101 is "255", and the default value corresponding to the localPriority parameter of each port is "128", so that the second priority parameter value corresponding to the localPriority parameter of the first network device 101 is inferior to the default value corresponding to the localPriority parameter of each port.

The at least one first clock parameter includes one or more of the following clock parameters: at least one first clock quality parameter, a first clock identity, a first clock priority parameter, and the like. The first clock identity is a clock identity of the first network device 101, and the first clock priority parameter is a clock priority parameter of the first network device 101, and the like. The clock priority parameter of the first network device 101 may also be referred to as a priority parameter 2 (Priority 2) of the first network device 101.

In some embodiments, the at least one first clock quality parameter includes one or more of the following clock quality parameters: a first clock class, first clock accuracy, a first offset scaled log variance, and the like.

The first network device 101 includes a first local dataset, and the first local dataset includes one or more of the following parameter values: the second priority parameter value corresponding to the localPriority parameter of the first network device 101 and a parameter value corresponding to each of the at least one first clock parameter. In other words, the first local dataset includes one or more of the following parameter values: the second priority parameter value corresponding to the localPriority parameter of the first network device 101, a parameter value corresponding to the first clock class, a parameter value corresponding to the first clock accuracy, a parameter value corresponding to the first offset scaled log variance, a parameter value corresponding to the first clock priority parameter, the first clock identity, and the like.

For example, it is assumed that the first local dataset includes a second priority parameter value "255", a parameter value A1 corresponding to the first clock class, a parameter value A2 corresponding to the first clock accuracy, a parameter value A3 corresponding to the first offset scaled log variance, a parameter value A4 corresponding to the first clock priority parameter and a first clock identity ID1.

The second network device 102 also includes at least one synchronization source selection parameter.

The at least one synchronization source selection parameter of the second network device 102 includes a localPriority parameter, at least one second clock parameter, and/or the like. The at least one synchronization source selection parameter is a parameter of the clock of the second network device 102.

The second network device 102 includes at least one port, and each port also includes a localPriority parameter. A priority parameter value corresponding to the localPriority parameter of the second network device 102 is equal to a default value corresponding to the localPriority parameter of each port. For example, the priority parameter value corresponding to the localPriority parameter of the second network device 102 is "128", and the default value corresponding to the localPriority parameter of each port is "128", so that the priority parameter value corresponding to the local-Priority parameter of the second network device 102 is equal to the default value corresponding to the localPriority parameter of each port.

The at least one second clock parameter includes one or more of the following clock parameters: at least one second clock quality parameter, a second clock identity, a second clock priority parameter, and/or the like. The second clock identity is a clock identity of the second network device 102, and the second clock priority parameter is a clock priority parameter of the second network device 102, and the like. The clock priority parameter of the second network device 102 may also be referred to as a priority parameter 2 of the second network device 102.

In some embodiments, the at least one second clock quality parameter includes one or more of the following clock quality parameters: a second clock class, second clock accuracy, a second offset scaled log variance, and/or the like.

The second network device 102 includes a second local dataset, and the second local dataset includes one or more of the following parameter values: the priority parameter value corresponding to the localPriority parameter of the second network device 102 and a parameter value corresponding to each of the at least one second clock parameter. In other words, the second local dataset includes one or more of the following parameter values: the priority parameter value corresponding to the localPriority parameter of the second network device 102, a parameter value corresponding to the second clock class, a parameter value corresponding to the second clock accuracy, a parameter value corresponding to the second offset scaled log variance, a parameter value corresponding to the second clock priority parameter, the second clock identity, and the like.

For example, it is assumed that the second local dataset includes a priority parameter value "128" corresponding to the localPriority parameter of the second network device 102, a parameter value B1 corresponding to the second clock class, a parameter value B2 corresponding to the second clock accuracy, a parameter value B3 corresponding to the second offset scaled log variance, a parameter value B4 corresponding to the second clock priority parameter, and a second clock identity ID2.

For each of the at least one third network device 103, the third network device also includes at least one synchronization source selection parameter.

The at least one synchronization source selection parameter of the third network device includes a localPriority parameter, at least one third clock parameter, and/or the like. The at least one synchronization source selection parameter is a parameter of a clock of the third network device.

The third network device includes at least one port, and each port also includes a localPriority parameter. A default value corresponding to the localPriority parameter of the third network device is inferior to a default value corresponding to the localPriority parameter of each port. For example, it is assumed that the priority parameter value corresponding to the localPriority parameter of the third network device is "255", and the default value corresponding to the localPriority parameter of each port is "128", so that the priority parameter value corresponding to the localPriority parameter of the third network device is inferior to the default value corresponding to the localPriority parameter of each port.

The at least one third clock parameter includes one or more of the following clock parameters: at least one third clock quality parameter, a third clock identity, a third clock priority parameter, and/or the like. The third clock identity is a clock identity of the third network device, and the third clock priority parameter is a clock priority parameter of the third network device. The clock priority parameter of the third network device may also be referred to as a priority parameter 2 of the third network device.

In some embodiments, the at least one third clock quality parameter includes one or more of the following clock quality parameters: a third clock class, third clock accuracy, a third offset scaled log variance, and/or the like.

The third network device includes a third local dataset, and the third local dataset includes one or more of the following parameter values: the priority parameter value corresponding to the localPriority parameter of the third network device and a parameter value corresponding to each of the at least one third clock parameter. In other words, the third local dataset includes one or more of the following parameter values: the priority parameter value corresponding to the localPriority parameter of the third network device, a parameter value corresponding to the third clock class, a parameter value corresponding to the third clock accuracy, a parameter value corresponding to the third offset scaled log variance, a parameter value corresponding to the third clock priority parameter, the third clock identity, and the like.

For example, it is assumed that the third local dataset includes a priority parameter value "255" corresponding to the localPriority parameter of the third network device, a parameter value C1 corresponding to the third clock class, a parameter value C2 corresponding to the third clock accuracy, a parameter value C3 corresponding to the third offset scaled log variance, a parameter value C4 corresponding to the third clock priority parameter, and a third clock identity ID3.

In some embodiments, for the first clock parameter, the second clock parameter, and the third clock parameter of a same type, the parameter value corresponding to the first clock parameter, the parameter value corresponding to the second clock parameter, and the parameter value corresponding to the third clock parameter are equal. In other words, the parameter value A1 corresponding to the first clock class, the parameter value B1 corresponding to the second clock class, and the parameter value C1 corresponding to the third clock class are equal. The parameter value A2 corresponding to the first clock accuracy, the parameter value B2 corresponding to the second clock accuracy, and the parameter value C2 corresponding to the third clock accuracy are equal. The parameter value A3 corresponding to the first offset scaled log variance, the parameter value B3 corresponding to the second offset scaled log variance, and the parameter value C3 corresponding to the third offset scaled log variance are equal.

In some embodiments, the priority parameter value corresponding to the first clock priority parameter is equal to the priority parameter value corresponding to the second clock priority parameter. However, both of the priority parameter value corresponding to the first clock priority parameter and the priority parameter value corresponding to the second clock priority parameter are superior to the priority parameter value corresponding to the third clock priority parameter. In other words, the parameter value A4 corresponding to the first clock priority parameter is equal to the parameter value B4 corresponding to the second clock priority parameter, but both A4 and B4 are superior to the parameter value C4 corresponding to the third clock priority parameter.

A sequence of the first clock identity of the first network device 101 and the second clock identity of the second network device 102 is that the second clock identity of the second network device 102 is prior to the first clock identity of the first network device 101.

Figure 2:
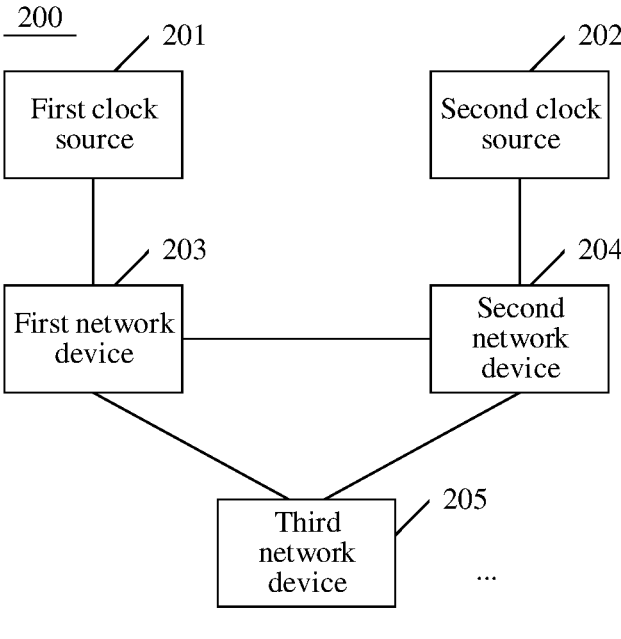
FIG. 2 is a schematic diagram of another network architecture according to an embodiment of this application.

Refer to FIG. 2. An embodiment of this application provides a network architecture 200, including: a first clock source 201, a second clock source 202, and a first network device 203. The first network device 203 includes a first port and a second port. The first network device 203 communicates with the first clock source 201 through the first port, and communicates with the second clock source 202 through the second port.

In some embodiments, the first clock source 201 is an active clock source, and the second clock source 202 is a standby clock source. The first network device 201 traces the first clock source 201, and traces the second clock source 202 when the first network device 201 cannot trace the first clock source 201.

That the first network device 203 traces the first clock source 201 means that the first network device 203 synchronizes time of the first network device 203 with time of the first clock source 201.

During implementation, the first network device 203 receives a first synchronization packet sent by the first clock source 201, where the first synchronization packet includes the time of the first clock source 201, and synchronizes the time of the first network device 203 based on the time included in the first synchronization packet.

In some embodiments, the network architecture 200 further includes a second network device 204 and at least one third network device 205. The second network device 204 communicates with the second clock source 202, and the first network device 203 communicates with the second network device 204 through the second port. For each of the at least one third network device 205, the third network device communicates with the first network device 203, and the third network device 205 communicates with the second network device 204.

When the first network device 203 traces the first clock source 201, the second network device 204 and each third network device also trace the first clock source.

During implementation, the first network device 203 sends a second synchronization packet, where the second synchronization packet includes the time of the first network device 203 on which synchronization is performed. The second network device 204 receives the second synchronization packet, and synchronizes time of the second network device 204 based on the time included in the second synchronization packet. For each third network device, the third network device receives the second synchronization packet, and synchronizes time of the third network device based on the time included in the second synchronization packet.

When the first network device 203 cannot trace the first clock source 201, the second network device 204 traces the second clock source 202, and the first network device 101 and each third network device also trace the second clock source 202.

That the second network device 204 traces the second clock source 202 means that the second network device 204 synchronizes the time of the second network device 204 with time of the second clock source 202.

During implementation, the second network device 204 receives a third synchronization packet sent by the second clock source 202, where the third synchronization packet includes the time of the second clock source 202, and synchronizes the time of the second network device 204 based on the time included in the third synchronization packet.

That the first network device 203 and each third network device trace the second clock source 202 means that the second network device 204 sends a fourth synchronization packet, where the fourth synchronization packet includes the time of the second network device 204 on which time synchronization is performed. The first network device 203 receives the fourth synchronization packet sent by the second network device 204, and synchronizes the time of the first network device 203 based on the time included in the fourth synchronization packet. For each third network device, the third network device receives the fourth synchronization packet sent by the second network device 204, and synchronizes time of the third network device based on the time included in the fourth synchronization packet.

When the first network device 201 cannot trace the first clock source 201, the second network device 204 traces the second clock source 203. In addition, the first network device 203 and each third network device also trace the second clock source 202. In other words, the first network device 203 and each third network device receive the fourth synchronization packet sent by the second network device

204, and perform time synchronization based on the time in the fourth synchronization packet.

When the first network device 201 can trace the first clock source 201, if the first network device 203 stops tracing the second clock source 202 and starts to trace the first clock source 201, the second network device 204 and each third network device also trace the first clock source 201, so that a network device switches a traced clock source. This increases a frequency of switching the traced clock source, and affects network stability.

Refer to FIG. 3. An embodiment of this application provides a clock source selection method 300. The method 300 is applied to the network architecture 100 shown in FIG. 1. In the method 300, when a first network device cannot trace a clock of a second network device, the first network device selects the first network device as a synchronization tracing source by modifying a value of a localPriority parameter of the first network device. The method 300 includes the following steps.

Step 301: The first network device traces the clock of the second network device.

In the network architecture 100, the second network device is an active synchronization tracing source, and the first network device is a standby synchronization tracing source. Therefore, each network device in the network architecture selects the second network device as the synchronization tracing source, and traces the clock of the second network device.

After the first network device traces the clock of the second network device, time of the first network device is synchronized with time of the second network device, and/or a frequency of the first network device is synchronized with a frequency of the second network device.

For the first network device in the network architecture, an operation that the first network device selects the second network device as the synchronization tracing source is as follows.

The first network device receives, through a first port, a first notification packet sent by the second network device, where the first notification packet includes a parameter value corresponding to each of at least one second clock parameter of the second network device, and the first port is a port that is on the first network device and that is for communicating with the second network device; and obtains a first dataset, where the first dataset includes a priority parameter value corresponding to a localPriority parameter of the first port and the parameter value corresponding to each second clock parameter in the first notification packet.

The first network device receives, through a second port, a second notification packet sent by a third network device communicating with the first network device, where the second notification packet includes a parameter value corresponding to each of at least one third clock parameter of the third network device, and the second port is a port that is on the first network device and that is for communicating with the third network device; and obtains a second dataset, where the second dataset includes a priority parameter value corresponding to a localPriority parameter of the second port and the parameter value corresponding to each third clock parameter in the second notification packet.

The first network device performs clock source selection based on the first local dataset, the first dataset, and the second dataset by using a specified clock source selection algorithm, and selects the second network device as the synchronization tracing source.

In some embodiments, the first dataset includes one or more of the following parameter values: the priority parameter value corresponding to the localPriority parameter of the first port, a parameter value corresponding to a second clock class, a parameter value corresponding to second clock accuracy, a parameter value corresponding to a second offset scaled log variance, a parameter value corresponding to a second clock priority parameter, a second clock identity, and the like. For example, it is assumed that the first dataset includes a priority parameter value "128" corresponding to the localPriority parameter of the first port, a parameter value B1 corresponding to the second clock class, a parameter value B2 corresponding to the second clock accuracy, a parameter value B3 corresponding to the second offset scaled log variance, a parameter value B4 corresponding to the second clock priority parameter, and a second clock identity ID2.

In some embodiments, the second dataset includes one or more of the following parameter values: the priority parameter value corresponding to the localPriority parameter of the second port, a parameter value corresponding to a third clock class, a parameter value corresponding to third clock accuracy, a parameter value corresponding to a third offset scaled log variance, a parameter value corresponding to a third clock priority parameter, a third clock identity, and the like. For example, it is assumed that the second dataset includes a priority parameter value "128" corresponding to the localPriority parameter of the second port, a parameter value C1 corresponding to the third clock class, a parameter value C2 corresponding to the third clock accuracy, a parameter value C3 corresponding to the third offset scaled log variance, a parameter value C4 corresponding to the third clock priority parameter, and a third clock identity ID3.

[ono] In some embodiments, the clock source selection operation is as follows. For any two datasets of the first local dataset, the first dataset, and the second dataset, it is assumed that the first local dataset and the first dataset are used as an example to compare the first local dataset with the first dataset, to select an optimal dataset from the two datasets. Then, the selected dataset is compared with the second dataset, to select an optimal dataset from the two datasets, and a network device corresponding to the optimal dataset is used as the synchronization tracing source.

The first local dataset includes one or more of the following parameter values: a second priority parameter value corresponding to the localPriority parameter of the first network device, a parameter value corresponding to a first clock class, a parameter value corresponding to first clock accuracy, a parameter value corresponding to a first offset scaled log variance, a parameter value corresponding to a first clock priority parameter, a first clock identity, and the like. For example, it is assumed that the first local dataset includes the second priority parameter value "255", a parameter value A1 corresponding to the first clock class, a parameter value A2 corresponding to the first clock accuracy, a parameter value A3 corresponding to the first offset scaled log variance, a parameter value A4 corresponding to the first clock priority parameter, a first clock identity ID1, and the like.

Figure 4:
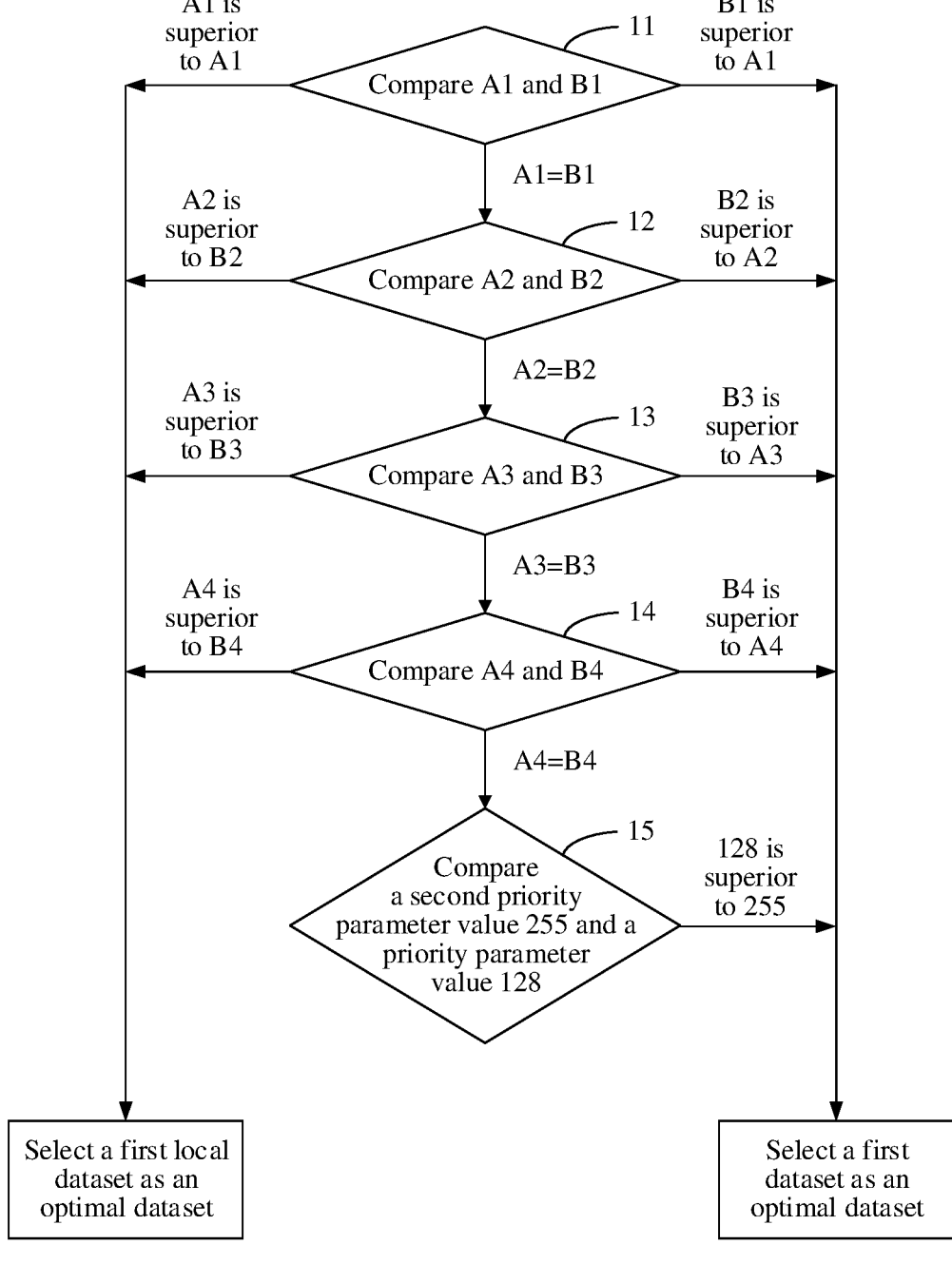
FIG. 4 is a schematic flowchart of comparing datasets according to an embodiment of this application.

Refer to FIG. 4. A comparison process is as follows.

11: Compare the parameter value A1 corresponding to the first clock class with the parameter value B1 corresponding to the second clock class, and if a comparison result is A1=B1, perform operation 12.

If A1 is superior to B1 through comparison, the first local dataset is selected as the optimal dataset. If B1 is superior to A1 through comparison, the first dataset is selected as the optimal dataset. However, in this embodiment of this application, the parameter value A1 corresponding to the first clock class is preconfigured to be equal to the parameter value B1 corresponding to the second clock class. Therefore, A1=B1 is obtained through comparison.

12: Compare the parameter value A2 corresponding to the first clock accuracy with the parameter value B2 corresponding to the second clock accuracy, and if a comparison result is A2=B2, perform operation 13.

If A2 is superior to B2 through comparison, the first local dataset is selected as the optimal dataset. If B2 is superior to A2 through comparison, the first dataset is selected as the optimal dataset. However, in this embodiment of this application, the parameter value A2 corresponding to the first clock accuracy is preconfigured to be equal to the parameter value B2 corresponding to the second clock accuracy. Therefore, A2=B2 is obtained through comparison.

13: Compare the parameter value A3 corresponding to the first offset scaled log variance with the parameter value B3 corresponding to the second offset scaled log variance, and if a comparison result is A3=B3, perform operation 14.

If A3 is superior to B3 through comparison, the first local dataset is selected as the optimal dataset. If B3 is superior to A3 through comparison, the first dataset is selected as the optimal dataset. However, in this embodiment of this application, the parameter value A3 corresponding to the first offset scaled log variance is preconfigured to be equal to the parameter value B3 corresponding to the second offset scaled log variance. Therefore, A3=B3 is obtained through comparison.

14: Compare the parameter value A4 corresponding to the first clock priority parameter with the parameter value B4 corresponding to the second clock priority parameter, and if a comparison result is A4=B4, perform operation 15.

If A4 is superior to B4 through comparison, the first local dataset is selected as the optimal dataset. If B4 is superior to A4 through comparison, the first dataset is selected as the optimal dataset. However, in this embodiment of this application, the parameter value A4 corresponding to the first clock priority parameter is preconfigured to be equal to the parameter value B4 corresponding to the second clock priority parameter. Therefore, A4=B4 is obtained through comparison.

15: Compare the second priority parameter value "255" corresponding to the localPriority parameter of the first network device with the priority parameter value "128" corresponding to the localPriority parameter of the first port, and select the first dataset as the optimal dataset if a comparison result is that the priority parameter value "128" is superior to the second priority parameter value "255".

For the second dataset, the first network device compares the selected first dataset with the second dataset based on the foregoing processes 11 to 15, to select an optimal dataset from the two datasets, where the selected optimal dataset is the first dataset.

Because the optimal dataset finally selected by the first network device from the first local dataset, the first dataset, and the second dataset is the first dataset, the first network device uses the second network device corresponding to the first dataset as the synchronization tracing source, and traces the clock of the second network device.

The first network device also sends a third notification packet to the second network device and the third network device. The third notification packet includes a parameter value corresponding to each of at least one first clock parameter. Therefore, the second network device and the third network device also perform clock source selection in the same way as the first network device, and both select the second network device as the synchronization tracing source.

The second network device is used as an example. The second network device receives, through a third port, the third notification packet sent by the first network device, where the third port is a port that is on the second network device and that is for communicating with the first network device; and obtains a third dataset, where the third dataset includes a priority parameter value corresponding to a localPriority parameter of the third port and the parameter value corresponding to each first clock parameter in the third notification packet.

The second network device receives, through a fourth port, the second notification packet sent by the third network device communicating with the second network device, where the fourth port is a port that is on the first network device and that is for communicating with the third network device; and obtains a fourth dataset, where the fourth dataset includes a priority parameter value corresponding to a localPriority parameter of the fourth port and the parameter value corresponding to each third clock parameter in the second notification packet.

In some embodiments, the third dataset includes one or more of the following parameter values: the priority parameter value corresponding to the localPriority parameter of the third port, the parameter value corresponding to the first clock class, the parameter value corresponding to the first clock accuracy, the parameter value corresponding to the first offset scaled log variance, the parameter value corresponding to the first clock priority parameter, the first clock identity, and the like. For example, it is assumed that the third dataset includes a priority parameter value "128" corresponding to the localPriority parameter of the third port, the parameter value A1 corresponding to the first clock class, the parameter value A2 corresponding to the first clock accuracy, the parameter value A3 corresponding to the first offset scaled log variance, the parameter value A4 corresponding to the first clock priority parameter, and the first clock identity ID1.

In some embodiments, the fourth dataset includes one or more of the following parameter values: the priority parameter value corresponding to the localPriority parameter of the fourth port, the parameter value corresponding to the third clock class, the parameter value corresponding to the third clock accuracy, the parameter value corresponding to the third offset scaled log variance, the parameter value corresponding to the third clock priority parameter, the third clock identity, and the like. For example, it is assumed that the fourth dataset includes a priority parameter value "128" corresponding to the localPriority parameter of the fourth port, the parameter value C1 corresponding to the third clock class, the parameter value C2 corresponding to the third clock accuracy, the parameter value C3 corresponding to the third offset scaled log variance, the parameter value C4 corresponding to the third clock priority parameter, and the third clock identity ID3.

A second local dataset of the second network device includes one or more of the following parameter values: a priority parameter value corresponding to a localPriority parameter of the second network device, the parameter value corresponding to the second clock class, the parameter value corresponding to the second clock accuracy, the parameter value corresponding to the second offset scaled log variance, the parameter value corresponding to the second clock priority parameter, the second clock identity, and the like. For example, it is assumed that the second local dataset includes a priority parameter value "128" corresponding to the localPriority parameter of the second network device, the parameter value B1 corresponding to the second clock class, the parameter value B2 corresponding to the second clock accuracy, the parameter value B3 corresponding to the second offset scaled log variance, the parameter value B4 corresponding to the second clock priority parameter, and the second clock identity ID2.

For any two datasets of the second local dataset, the third dataset, and the fourth dataset, it is assumed that the second local dataset and the third dataset are used as an example to compare the second local dataset with the third dataset, to select an optimal dataset from the two datasets. Then, the selected dataset is compared with the fourth dataset, to select an optimal dataset from the two datasets, and a network device corresponding to the finally selected optimal dataset is used as the synchronization tracing source.

Figure 5:
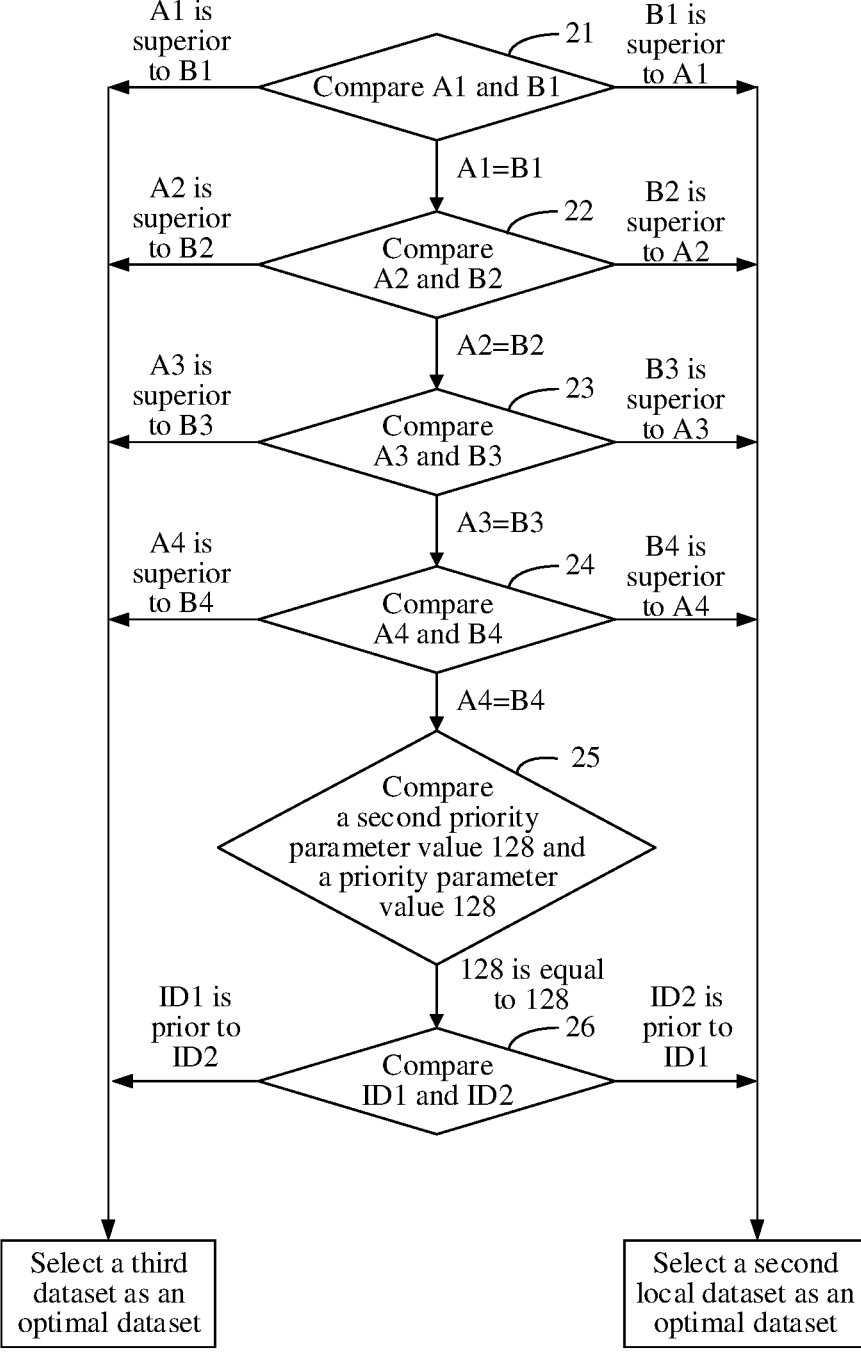
FIG. 5 is another schematic flowchart of comparing datasets according to an embodiment of this application.

Refer to FIG. 5. A comparison process is as follows.

21 to 24 are respectively the same as 11 to 14 in FIG. 5, and details are not described herein again.

25: Compare the priority parameter value "128" corresponding to the localPriority parameter of the second network device with the priority parameter value "128" corresponding to the localPriority parameter of the third port. A comparison result is that the two priority parameter values are equal, and operation 26 is performed.

26: Compare the first clock identity "ID1" with the second clock identity "ID2", where a comparison result is that "ID2" is prior to "ID1", and the second local dataset is selected as the optimal dataset.

For the fourth dataset, the second network device compares the selected second local dataset with the fourth dataset based on the foregoing processes 21 to 26, to select an optimal dataset from the two datasets, where the finally selected optimal dataset is the second local dataset. The second network device uses the second network device corresponding to the second local dataset as the synchronization tracing source.

Similar to the first network device or the second network device, the third network device selects the second network device as the synchronization tracing source.

It should be noted that the network device periodically sends a notification packet. In other words, the first network device periodically sends the third notification packet. The third notification packet includes a parameter value currently corresponding to each of the at least one third clock parameter. Similar to the first network device, the second network device and the third network device also periodically send the notification packet.

Step 302: When the first network device cannot trace the clock of the second network device, the first network device becomes an active clock tracing source, and modifies the second priority parameter value corresponding to the localPriority parameter of the first network device to a first priority parameter value.

The first priority parameter value is superior to the second priority parameter value. The first priority parameter value is also superior to the priority parameter value corresponding to the localPriority parameter of the second network device.

The second priority parameter value is inferior to the priority parameter value corresponding to the localPriority parameter of the first port, and the first port is the port that is on the first network device and that is for communicating with the second network device. The first priority parameter value is superior to the priority parameter value corresponding to the localPriority parameter of the first port.

For example, a smaller priority parameter value corresponding to the localPriority parameter indicates a superior priority parameter value corresponding to the localPriority parameter. It is assumed that a default value corresponding to the localPriority parameter of the first port is "128", to be specific, the priority parameter value corresponding to the localPriority parameter of the first port is "128", and it is assumed that the second priority parameter value is "255", and the first priority parameter value is "100". When the first network device cannot trace the clock of the second network device, the first network device modifies the second priority parameter value "255" corresponding to the localPriority parameter of the first network device to the first priority parameter value "100". Therefore, the first priority parameter value corresponding to the localPriority parameter of the first network device is superior to the priority parameter value corresponding to the localPriority parameter of the first port.

After the second priority parameter value corresponding to the localPriority parameter of the first network device is modified to the first priority parameter value, the priority parameter value corresponding to the localPriority parameter of the first network device included in the first local dataset changes to the first priority parameter value accordingly.

In step 302, that the first network device cannot trace the clock of the second network device means that the first network device cannot receive a packet (a notification packet and/or a synchronization packet) sent by the second network device. The cause may be that the first port is faulty, a link between the first network device and the second network device is faulty, the second network device is faulty, and/or the like.

When the first network device cannot trace the clock of the second network device, the third network device may also fail to trace the clock of the second network device. In this case, the first network device and the third network device reselect a synchronization tracing source, and both select the first network device as the synchronization tracing source, so that the first network device becomes the active synchronization tracing source. For a detailed implementation process of selecting the synchronization tracing source by the first network device and the third network device, refer to the detailed implementation process of selecting the synchronization tracing source in FIG. 4 or FIG. 5. Details are not described herein again.

The first network device has traced the second network device, the time of the first network device is synchronized with the time of the second network device, and/or the frequency of the first network device is synchronized with the frequency of the second network device. Therefore, when the first network device becomes the active synchronization tracing source, another network device traces the first network device, and time and/or a frequency of the another network device does not jump.

When the first port recovers, the link between the first network device and the second network device recovers, and/or the second network device recovers, the first network device receives the packet from the second network device through the first port, and it indicates that the first network device can trace the clock of the second network device.

Step 303: When the first network device can trace the clock of the second network device, the first network device selects the synchronization tracing source based on the first priority parameter value, and the selected synchronization tracing source is the first network device.

When the first network device can trace the clock of the second network device and when receiving the packet from the second network device through the first port, the first network device compares the first priority parameter value with the priority parameter value corresponding to the localPriority parameter of the first port, and when determining by comparison that the first priority parameter value is superior to the priority parameter value corresponding to the localPriority parameter of the first port, the first network device selects the first network device as the synchronization tracing source.

In step 303, the first network device receives the first notification packet from the second network device through the first port, to obtain a first dataset, and receives the second notification packet from the third network device through the second port, to obtain a second dataset. The first dataset and the second dataset obtained herein are respectively the same as the first dataset and the second dataset obtained in step 301.

Because the priority parameter value corresponding to the localPriority parameter of the first network device in the first local dataset is modified to the first priority parameter value, in a process of selecting the synchronization tracing source, the first network device compares the first local dataset with the first dataset based on the comparison process shown in FIG. 4, and when comparing the first priority parameter value with the priority parameter value corresponding to the localPriority parameter of the first port, obtains a comparison result indicating that the first priority parameter value is superior to the priority parameter value corresponding to the localPriority parameter of the first port, and the first network device selects the first local dataset as the optimal dataset. Then, when comparing the first local dataset with the second dataset based on the comparison process shown in FIG. 4, the first network device still determines by comparison that the first local dataset is the optimal dataset, and selects the first network device corresponding to the first local dataset as the synchronization tracing source.

When the second network device recovers from a fault, the clock of the second network device is reset. For example, the second network device resets the clock of the second network device to a state at delivery, in other words, the second network device resets the time of the second network device to time at delivery, and/or resets the frequency of the second network device to a frequency at delivery.

When the second network device recovers from the fault, the second network device adjusts a default value of the local priority localPriority parameter of the second network device to be inferior to a default value of a localPriority parameter value of a port of the second network device. Then, the second network device performs clock source selection based on an adjusted default value of the localPriority parameter and the default value of the localPriority parameter value of the port of the second network device, and the selected synchronization tracing source is the first network device. In this way, the second network device traces a clock of the first network device, so that the time of the second network device is synchronized with the time of the first network device, and/or the frequency of the second network device is synchronized with the frequency of the first network device.

In some embodiments, a priority parameter value corresponding to the adjusted local priority localPriority parameter of the second network device is equal to the second priority parameter value. For example, the second priority parameter value is "255", and the priority parameter value corresponding to the adjusted local priority localPriority parameter of the second network device is also "255".

After the second network device adjusts the default value of the localPriority parameter of the second network device to be inferior to the default value of the localPriority parameter value of the port of the second network device, the priority parameter value corresponding to the localPriority parameter value of the second network device in the second local dataset of the second network device also changes to be inferior to the default value of the localPriority parameter value of the port of the second network device.

For example, it is assumed that the second network device adjusts the default value of the localPriority parameter of the second network device to "255", and the default value of the localPriority parameter value of the port of the second network device is "128", so that the default value of the localPriority parameter of the second network device is inferior to the default value of the localPriority parameter value of the port of the second network device. The ports of the second network device include the third port for communicating with the first network device. Therefore, the priority parameter value corresponding to the localPriority parameter value of the second network device in the second local dataset is inferior to a default value of the localPriority parameter value of the third port. In this way, after receiving the third notification packet sent by the first network device and obtaining the third dataset, the second network device selects the third dataset as the optimal dataset based on the second local dataset, the third dataset, and the comparison process shown in FIG. 5, and uses the first network device corresponding to the third dataset as the synchronization tracing source.

In some embodiments, the second network device sends the first notification packet after performing clock source selection, where the first notification packet includes a parameter value of a synchronization source selection parameter of the second network device.

In some embodiments, the parameter value corresponding to the synchronization source selection parameter of the second network device included in the first notification packet is the parameter value corresponding to each of the at least one second clock parameter.

The network device periodically sends the notification packet, and when the second network device recovers, the second network device sends the first notification packet to the third network device after waiting for one or more periods.

The second network device traces the clock of the first network device after performing clock source selection, in other words, the time of the second network device is synchronized with the time of the first network device, and/or the frequency of the second network device is synchronized with the frequency of the first network device. In this way, the second network device sends the first notification packet after performing clock source selection, and the third network device receives the first notification packet and performs a clock source selection operation.

A parameter value corresponding to a first clock quality parameter is equal to a parameter value corresponding to a second clock quality parameter, where the first clock quality parameter and the second clock quality parameter are of a same type, the priority parameter value corresponding to the first clock priority parameter is equal to the priority parameter value corresponding to the second clock priority parameter, and the second clock identity of the second network device is sorted before the first clock identity of the first network device. Therefore, when performing clock source selection, the third network device selects the second network device as the synchronization tracing source, and traces the clock of the second network device.

Because the second network device has traced the first network device, and the third network device has also traced the clock of the first network device, after the third network device traces the clock of the second network device, a clock of the third network device does not jump. In other words, time of the third network device does not jump, and/or a frequency of the third network device does not jump.

In this embodiment of this application, the first network device traces the clock of the second network device. When the first network device cannot trace the clock of the second network device, the first network device automatically becomes the active clock tracing source, and modifies the second priority parameter value corresponding to the localPriority parameter of the first network device to the first priority parameter value. Because the first priority parameter value is superior to the priority parameter value corresponding to the localPriority parameter of the first port, and the first port is the port that is on the first network device and that is for communicating with the second network device, although the first network device can trace the clock of the second network device, the first network device continues to select the first network device as the synchronization tracing source based on the first priority parameter value, to be specific, the first network device does not trace the second network device. In other words, even if the second network device recovers, and the clock of the second network device is reset, because the first network device does not trace the clock of the second network device, the clock does not jump. In addition, the second network device selects the first network device as the synchronization tracing source, and the second network device traces the clock of the first network device. In this way, when the third network device selects to trace the clock of the first network device, a jump of the clock of the third network device is avoided.

Figures 6, 7:
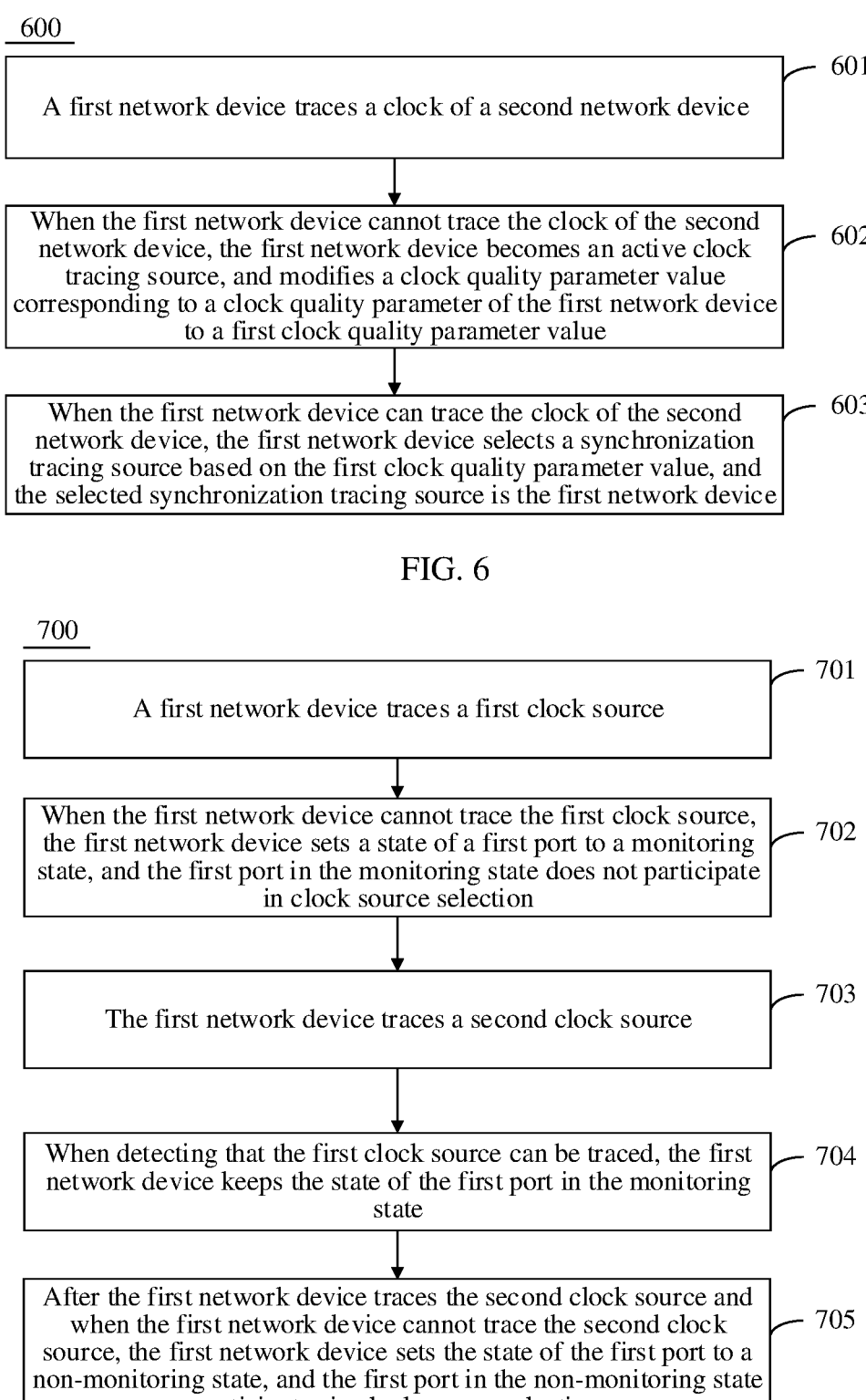
FIG. 6 is a flowchart of another clock source selection method according to an embodiment of this application.
FIG. 7 is a flowchart of another clock source selection method according to an embodiment of this application.

Refer to FIG. 6. An embodiment of this application provides a clock source selection method 600. The method 600 is applied to the network architecture 100 shown in FIG. 1. In the method 600, when a first network device cannot trace a clock of a second network device, the first network device selects the first network device as a synchronization tracing source by modifying a value of a clock quality parameter of the first network device. The method 600 includes the following steps.

Step 601: This step is the same as step 301 in the method 300 shown in FIG. 3, and is not described in detail herein again.

Step 602: When the first network device cannot trace the clock of the second network device, the first network device becomes an active clock tracing source, and modifies the clock quality parameter value corresponding to the clock quality parameter of the first network device to a first clock quality parameter value.

The first clock quality parameter value is superior to a second clock quality parameter value, and the second clock quality parameter value is a clock quality parameter value corresponding to a clock quality parameter of the second network device.

The first network device may modify a clock quality parameter value corresponding to one clock quality parameter, or may modify clock quality parameter values corresponding to a plurality of clock quality parameters.

In some embodiments, the modified clock quality parameter includes one or more of the following parameters: a first clock class, first clock accuracy, and a first offset scaled log variance.

For example, when the first network device cannot trace the clock of the second network device, the first network device modifies a parameter value A1 corresponding to the first clock class of the first network device to A11, where A11 is superior to A1, and A1 is equal to a parameter value B1 corresponding to a second clock class of the second network device, that is, A11 is superior to B1, and/or modifies a parameter value A2 corresponding to the first clock accuracy of the first network device to A21, where A21 is superior to A2, and A2 is equal to a parameter value B2 corresponding to the second clock accuracy of the second network device, that is, A21 is superior to B2, and/or modifies a parameter value A3 corresponding to the first offset scaled log variance of the first network device to A31, where A31 is superior to A3, and A3 is equal to a parameter value B3 corresponding to a second offset scaled log variance of the second network device, that is, A31 is superior to B3.

After the clock quality parameter value corresponding to the clock quality parameter of the first network device is modified to the first clock quality parameter value, in a first local dataset of the first network device, the clock quality parameter value corresponding to the clock quality parameter of the first network device changes to the first clock quality parameter value accordingly.

When the first network device cannot trace the clock of the second network device, a third network device may also fail to trace the clock of the second network device. In this case, the first network device and the third network device reselect a synchronization tracing source, and both select the first network device as the synchronization tracing source, so that the first network device becomes an active synchronization tracing source. For a detailed implementation process of selecting the synchronization tracing source by the first network device and the third network device, refer to the detailed implementation process of selecting the synchronization tracing source in FIG. 4 or FIG. 5. Details are not described herein again.

Step 603: When the first network device can trace the clock of the second network device, the first network device selects the synchronization tracing source based on the first clock quality parameter value, and the selected synchronization tracing source is the first network device.

When the first network device can trace the clock of the second network device, the first network device receives a first notification packet from the second network device through a first port, where the first notification packet includes a second clock quality parameter; compares the first clock quality parameter value with the second clock quality parameter value; and when determining by comparison that the first clock quality parameter value is superior to the second clock quality parameter value, selects the first network device as the synchronization tracing source.

In step 603, the first network device receives the first notification packet from the second network device through the first port, to obtain a first dataset, where the first dataset includes a parameter value corresponding to each of at least one second clock parameter of the second network device and a priority parameter value corresponding to a localPriority parameter of the first port, and the parameter value corresponding to each second clock parameter includes the second clock quality parameter value; and receives a second notification packet from the third network device through a second port, to obtain a second dataset, where the second dataset includes a parameter value corresponding to each of at least one third clock quality parameter of the third network device and a priority parameter value corresponding to a localPriority parameter of the second port.

Because the first clock quality parameter value in the first local dataset is superior to the second clock quality parameter value in the first dataset, in a process of selecting the synchronization tracing source, the first network device compares the first local dataset with the first dataset based on the comparison process shown in FIG. 4, when comparing the first clock quality parameter value with the second clock quality parameter value, obtains a comparison result that the first clock quality parameter value is superior to the second clock quality parameter value, and selects the first local dataset as an optimal dataset. Then, when comparing the first local dataset with the second dataset based on the comparison process shown in FIG. 4, the first network device still determines by comparison that the first local dataset is the optimal dataset, and selects the first network device corresponding to the first local dataset as the synchronization tracing source.

For example, it is assumed that the first network device modifies the parameter value A1 corresponding to the first clock class to A11, in other words, the parameter value corresponding to the first clock class in the first local dataset is A11, and the parameter value corresponding to the second clock class in the first dataset obtained by the first network device is B1. Because A11 is superior to B1, when comparing the first local dataset with the first dataset, the first network device determines by comparison that the first local dataset is the optimal dataset. The first network device compares the first local dataset with the second dataset, determines by comparison that the first local dataset is the optimal dataset, and uses the first network device corresponding to the first local dataset as the synchronization tracing source.

When the second network device recovers from a fault, the second network device receives, through a third port, a third notification packet sent by the first network device, where the third notification packet includes a parameter value corresponding to each of at least one first clock parameter of the first network device, and the parameter value corresponding to each first clock parameter includes the first clock quality parameter value; and obtains a third dataset, where the third dataset includes a priority parameter value corresponding to a localPriority parameter of the third port and the parameter value corresponding to each first clock parameter.

A second local dataset of the second network device includes the second clock quality parameter value. Because the first clock quality parameter value is superior to the second clock quality parameter value, the second network device compares the second local dataset with the third dataset, and determines by comparison that the third dataset is the optimal dataset. Therefore, the first network device corresponding to the third dataset is selected as the synchronization tracing source, and a clock of the first network device is traced.

The third network device also receives the first notification packet and the third notification packet, and performs a clock source selection operation. Because the second clock quality parameter value included in the first notification packet is inferior to the first clock quality parameter value included in the third notification packet, the third network device also selects the first network device as the synchronization tracing source, and traces the clock of the first network device.

Therefore, when the first network device can trace the second network device, the first network device, the second network device, and the third network device still select the first network device as the synchronization tracing source to trace the clock of the first network device, so that the clock of the first network device, the clock of the second network device, and a clock of the third network do not jump.

In this embodiment of this application, the first network device traces the clock of the second network device. When the first network device cannot trace the clock of the second network device, the first network device automatically becomes the active clock tracing source, and modifies the clock quality parameter value corresponding to the clock quality parameter of the first network device to the first clock quality parameter value. Because the first clock quality parameter value is superior to the second clock quality parameter value corresponding to the clock quality parameter of the second network device, although the first network device can trace the clock of the second network device, the first network device continues to select the first network device as the synchronization tracing source based on the first clock quality parameter value, to be specific, the first network device does not trace the second network device. In other words, even if the second network device recovers, and the clock of the second network device is reset, because the first network device does not trace the clock of the second network device, the clock does not jump. In addition, the second network device and the third network device also select the first network device as the synchronization tracing source, to avoid that the clock of the second network device and the clock of the third network device jump.

Refer to FIG. 7. An embodiment of this application provides a clock source selection method 700. The method 700 is applied to the network architecture 200 shown in FIG. 2. In the method 700, a first network device selects a time source by setting a state of a first port to a monitoring state. The first port is a port that is on the first network device and that is for communicating with a first clock source. The method 700 includes the following steps.

Step 701: The first network device traces the first clock source.

The first network device communicates with the first clock source through the first port, and communicates with a second clock source through a second port.

Refer to FIG. 2. A second network device communicates with a second network device through the second port, and the second network device communicates with the second clock source.

In some embodiments, the first clock source is an active clock source, and the second clock source is a standby clock source.

In some embodiments, a clock class of the first clock source is superior to a clock class of the second clock source.

That the first network device traces the first clock source means that time of the first network device is synchronized with time of the first clock source.

In some embodiments, when the first network device traces the first clock source, the first network device sends a first notification packet and a second synchronization packet to the second network device and a third network device, where the first notification packet includes a first clock class, the first clock class is the clock class of the first clock source, and the second synchronization packet includes the time of the first network device. The second network device receives the first notification packet and the second synchronization packet, selects to trace the first network device based on the first clock class, and performs time synchronization based on the time included in the second synchronization packet. The third network device receives the first notification packet and the second synchronization packet, selects to trace the first network device based on the first clock class, and performs time synchronization based on the time included in the second synchronization packet.

In some embodiments, the second network device and/or the third network device may alternatively receive the clock class of the second clock source. Because the first clock class is superior to the clock class of the second clock source, the second network device and/or the third network device select to trace the first network device.

Step 702: When the first network device cannot trace the first clock source, the first network device sets the state of the first port to the monitoring state, where the first port in the monitoring state does not participate in clock source selection.

The first network device may monitor a state of the first clock source through the first port in the monitoring state.

In some embodiments, the monitoring state includes, for example, a passive only (passive only) state.

That the first network device cannot trace the first clock source may be: the first port is faulty, a link between the first network device and the first clock source is faulty, and/or the first clock source is faulty.

The first network device may fail to receive a packet sent by the first clock source, or the first network device receives a second notification packet sent by the first clock source, where the second notification packet carries a second clock class, the second clock class is the clock class of the first clock source, and the second clock class exceeds a first class range, and determines, based on the second clock class, that the first clock source is faulty, where the first class range includes at least one clock class corresponding to a clock source.

When the first network device cannot trace the first clock source, the second network device and the third network device trace the second clock source. During implementation, the first network device sends the first notification packet to the second network device, where the first notification packet includes a third clock class, the third clock class is a clock class of the first network device, the third clock class is within a second class range, and the second class range includes a clock class corresponding to a network device.

The second network device receives the first notification packet, determines, based on the third clock class in the first notification packet, that the first network device cannot trace the first clock source, and selects to trace the second clock source. Similarly, the third network device also traces the second network device.

Step 703: The first network device traces the second clock source.

Because the second network device traces the second clock source, time of the second network device is synchronized with that of the second clock source. The second network device sends a third notification packet and a fourth synchronization packet to the first network device, where the third notification packet includes a fourth clock class, the fourth clock class is the clock class of the second clock source, the fourth clock class is within the first class range, and the fourth synchronization packet includes the time of the second network device. The first network device receives the third notification packet and the fourth synchronization packet, selects to trace the second network device based on the fourth clock class, and performs time synchronization based on the time included in the fourth synchronization packet, to trace the second clock source.

When the first network device cannot trace the first clock source, the first network device traces the second clock source. In a process of tracing the second clock source, the first network device detects, through the first port in the monitoring state, whether the first clock source can be traced.

Step 704: When detecting that the first clock source can be traced, the first network device keeps the state of the first port in the monitoring state.

In a process that the first network device traces the second clock source, when the first network device detects, through the first port in the monitoring state, that the first clock source can be traced, the state of the first port keeps in the monitoring state. Because the first port in the monitoring state does not participate in clock source selection, the first network device continues to select to trace the second clock source, and does not switch a traced clock source, such as the first clock source, to the second clock source, so that the network devices in the entire network architecture do not switch a traced clock source. This improves network stability.

Step 705: After the first network device traces the second clock source, when the first network device cannot trace the second clock source, the first network device sets the state of the first port to a non-monitoring state, where the first port in the non-monitoring state participates in clock source selection.

When the second network device cannot trace the second clock source, the second network device sends a fourth notification packet to the first network device, where the fourth notification packet includes a fifth clock class, and the fifth clock class is within the second class range. The first network device receives the fourth notification packet, and because the fifth clock class is in the second class range, the first network device determines that the second network device cannot trace the second clock source. Because the first network device can trace the first clock source, the first network device recovers the state of the first port to the non-monitoring state.

When the first network device sets the state of the first port to be recovered to the non-monitoring state, the first network device selects to trace the first clock source. In this case, the second network device and the third network device select to trace the first network device.

In some embodiments, the non-monitoring state includes a master (Master) state, a slave (Slave) state, or the like.

In this embodiment of this application, the first network device traces the first clock source. When the first network device cannot trace the first clock source, the first network device sets the state of the first port to the monitoring state, where the first port is the port that is on the first network device and that is for communicating with the first clock source, and the first port in the monitoring state does not participate in clock source selection. The first network device traces the second clock source. When the first network device can trace the first clock source, the state of the first port keeps in the monitoring state. Because the first port in the monitoring state does not participate in clock source selection, the first network device still traces the first clock source. The first network device recovers the state of the first port to the non-monitoring state only when the first network device cannot trace the second clock source. The first port in the non-monitoring state may participate in clock source selection, so that the first network device can select to trace the first clock source. In this way, a frequency of switching the traced clock source can be reduced, and network stability can be improved.

Figure 8:
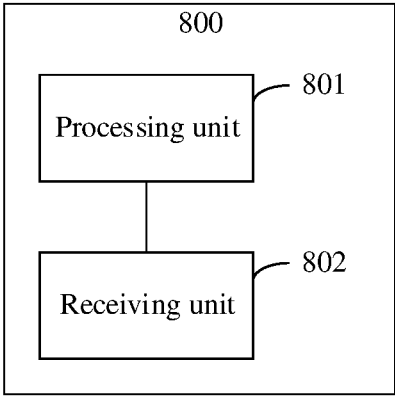
FIG. 8 is a schematic diagram of a structure of a clock source selection apparatus according to an embodiment of this application.

Refer to FIG. 8. This application provides a clock source selection apparatus 800. The apparatus 800 may be deployed on the first network device 101 in the network architecture 100 shown in FIG. 1, the first network device in the method 300 shown in FIG. 3, or the first network device in the method 600 shown in FIG. 6. The apparatus includes: a processing unit 801, configured to: after the apparatus 800 traces a clock of a second network device, when the apparatus 800 cannot trace the clock of the second network device, modify a parameter value corresponding to a synchronization source selection parameter of the apparatus 800 to a first parameter value, where the first parameter value is superior to a parameter value corresponding to a synchronization source selection parameter of the second network device.

Optionally, for a detailed implementation process in which the processing unit 801 modifies the parameter value corresponding to the synchronization source selection parameter of the apparatus 800 to the first parameter value, refer to related content in step 302 of the method 300 shown in FIG. 3 and step 602 of the method 600 shown in FIG. 6. Details are not described herein again.

Optionally, the synchronization source selection parameter of the apparatus 800 includes a local priority localPriority parameter of the apparatus 800, and the first parameter value includes a first priority parameter value.

The processing unit 801 is configured to modify a second priority parameter value corresponding to the localPriority parameter of the apparatus 800 to the first priority parameter value.

Optionally, for a detailed implementation process in which the processing unit 801 modifies the second priority parameter value corresponding to the localPriority parameter of the apparatus 800 to the first priority parameter value, refer to related content in step 302 of the method 300 shown in FIG. 3. Details are not described herein again.

Optionally, the second priority parameter value is inferior to a priority parameter value corresponding to a localPriority parameter of a first port, and the first port is a port that is on the apparatus 800 and that is for communicating with the second network device.

Optionally, the first priority parameter value is superior to the priority parameter value corresponding to the localPriority parameter of the first port, and the first port is the port that is on the apparatus 800 and that is for communicating with the second network device.

Optionally, the second priority parameter value is equal to the priority parameter value corresponding to the localPriority parameter of the second network device.

Optionally, the processing unit 801 is further configured to select a synchronization tracing source based on the first priority parameter value.

Optionally, for a detailed implementation process in which the processing unit 801 selects the synchronization tracing source based on the first priority parameter value, refer to related content in step 303 of the method 300 shown in FIG. 3. Details are not described herein again.

Optionally, the processing unit 801 is further configured to: when receiving a packet from the second network device through the first port, compare the first priority parameter value with the priority parameter value corresponding to the localPriority parameter of the first port, where the first port is the port that is on the apparatus 800 and that is for communicating with the second network device; and when determining by comparison that the first priority parameter value is superior to the priority parameter value corresponding to the localPriority parameter of the first port, select the apparatus 800 as the synchronization tracing source.

Optionally, the synchronization source selection parameter of the apparatus 800 includes a clock quality parameter of the apparatus 800, and the first parameter value includes a first clock quality parameter value.

The processing unit 801 is configured to modify a clock quality parameter value corresponding to the clock quality parameter of the apparatus 800 to the first clock quality parameter value.

Optionally, the clock quality parameter of the apparatus 800 includes one or more of a clock class, clock accuracy, and an offset scaled log variance of the apparatus 800.

Optionally, the processing unit 801 is further configured to select the synchronization tracing source based on the first clock quality parameter value.

Optionally, for a detailed implementation process in which the processing unit 801 selects the synchronization tracing based on the first clock quality parameter value, refer to related content in step 603 of the method 600 shown in FIG. 6. Details are not described herein again.

Optionally, the apparatus 800 further includes a receiving unit 802.

The receiving unit 802 is configured to receive a notification packet sent by the second network device, where the notification packet includes a second clock quality parameter value, and the second clock quality parameter value is a clock quality parameter value corresponding to a clock quality parameter of the second network device.

The processing unit 801 is further configured to: when the first clock quality parameter value is superior to the second clock quality parameter value, select the apparatus 800 as the synchronization tracing source.

Optionally, for a detailed implementation process in which the processing unit 801 selects the synchronization tracing, refer to related content in step 603 of the method 600 shown in FIG. 6. Details are not described herein again.

Optionally, there are one or more synchronization source selection parameters of the apparatus 800.

In this embodiment of this application, when the apparatus can trace the second network device, the clock of the second network device may be reset, and a network device in a network performs a clock source selection operation. Because the first parameter value is superior to the parameter value corresponding to the synchronization source selection parameter of the second network device, when performing clock source selection based on the first parameter value and the parameter value corresponding to the synchronization source selection parameter of the second network device, the processing unit continues to select the apparatus as the synchronization tracing source, to prevent the apparatus from tracing the second network device, and prevent a clock of the apparatus from jumping. In addition, because the first parameter value is superior to the parameter value corresponding to the synchronization source selection parameter of the second network device, when performing clock source selection, the second network device also selects to trace the apparatus, so that the clock of the second network device is synchronized with a clock of the apparatus. For a third network device other than the apparatus and the second network device in the network, when the apparatus cannot trace the clock of the second network device, the third network device selects to trace the clock of the apparatus. When the apparatus can trace the second network device, the third network device performs clock source selection, and may continue to select the apparatus as the synchronization tracing source, to prevent a clock of the third network device from jumping, or may select the second network as the synchronization tracing source. However, because the clock of the second network device is synchronized with the clock of the apparatus, the jump of the clock of the third network device is avoided.

Figure 9:
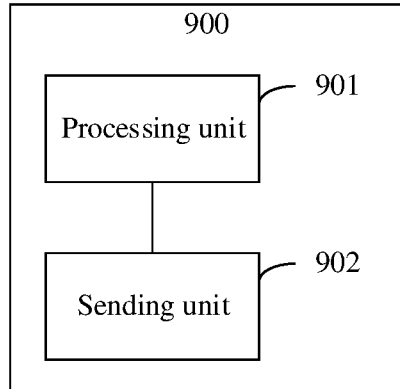
FIG. 9 is a schematic diagram of a structure of another clock source selection apparatus according to an embodiment of this application.

Refer to FIG. 9. This application provides a clock source selection apparatus 900. The apparatus 900 may be deployed on the second network device 102 in the network architecture 100 shown in FIG. 1, the second network device in the method 300 shown in FIG. 3, or the second network device in the method 600 shown in FIG. 6. The apparatus includes: a processing unit 901, configured to adjust a default value of a local priority localPriority parameter of the apparatus 900 to be inferior to a default value of a localPriority parameter value of a port of the apparatus 900.

The processing unit 901 is further configured to perform clock source selection based on an adjusted default value of the localPriority parameter of the apparatus 900 and the default value of the localPriority parameter value of the port of the apparatus 900.

Optionally, for a detailed implementation process in which the processing unit 901 modifies the default value of the local priority localPriority parameter of the apparatus 900 to be inferior to the default value of the localPriority parameter value of the port of the apparatus 900, refer to related content in step 303 of the method 300 shown in FIG. 3 and step 603 of the method 600 shown in FIG. 6. Details are not described herein again.

Optionally, for a detailed implementation process in which the processing unit 901 performs clock source selection based on the adjusted default value of the localPriority parameter of the apparatus 900 and the default value of the localPriority parameter value of the port of the apparatus 900, refer to related content in step 303 of the method 300 shown in FIG. 3 and step 603 of the method 600 shown in FIG. 6. Details are not described herein again.

Optionally, the apparatus 900 includes a plurality of ports, and default values of localPriority parameter values of the plurality of ports are the same.

Optionally, the apparatus 900 further includes: a sending unit 902, configured to send a notification packet after performing clock source selection, where the notification packet includes a parameter value of a synchronization source selection parameter of the apparatus 900.

In this embodiment of this application, the processing unit adjusts the default value of the local priority localPriority parameter of the apparatus to be inferior to the default value of the localPriority parameter value of the port of the apparatus; and performs clock source selection based on the adjusted default value of the localPriority parameter of the apparatus and the default value of the localPriority parameter value of the port of the apparatus. Because the default value of the localPriority parameter of the apparatus is adjusted to be inferior to the default value of the localPriority parameter value of the port of the apparatus, when performing clock source selection, the processing unit selects to trace an existing active synchronization tracing source in the network, and trace a clock of the active synchronization tracing source, to prevent a clock of the network device in the network from jumping.

Figure 10:
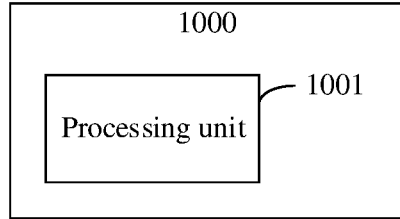
FIG. 10 is a schematic diagram of a structure of another clock source selection apparatus according to an embodiment of this application.

Refer to FIG. 10. This application provides a clock source selection apparatus moo. The apparatus moo may be deployed on the first network device 201 in the network architecture 200 shown in FIG. 2, or the first network device in the method 700 shown in FIG. 7. The apparatus includes: a processing unit low, configured to: after the apparatus woo traces a first clock source, when the apparatus woo cannot trace the first clock source, set a state of a first port to a monitoring state, where the first port is a port that is on the apparatus woo and that is for communicating with the first clock source, and the first port in the monitoring state does not participate in clock source selection; and when the apparatus woo can trace the first clock source, keep the state of the first port in the monitoring state.

Optionally, for a detailed implementation process in which the processing unit 1001 sets the port of the first port to the monitoring state, refer to related content in step 702 in the method 700 shown in FIG. 7. Details are not described herein again.

Optionally, the processing unit 1001 is further configured to trace a second clock source.

Optionally, for a detailed implementation process in which the processing unit 1001 traces the second clock source, refer to related content in step 703 of the method 700 shown in FIG. 7. Details are not described herein again.

Optionally, the processing unit 1001 is further configured to: after the apparatus moo traces the second clock source, when the apparatus moo cannot trace the second clock source, set the state of the first port to be recovered to a non-monitoring state, where the first port in the non-monitoring state participates in clock source selection.

Optionally, for a detailed implementation process in which the processing unit 1001 sets the port of the first port to be recovered to the non-monitoring state, refer to related content in step 704 in the method 700 shown in FIG. 7. Details are not described herein again.

In this embodiment of this application, after the apparatus traces the first clock source, when the apparatus cannot trace the first clock source, the processing unit 1001 sets the state of the first port to the monitoring state, and when the apparatus can trace the first clock source, keep the state of the first port in the monitoring state. After the apparatus cannot trace the first clock source, when the apparatus can trace the first clock source again, the state of the first port is kept in the monitoring state. Because the first port in the monitoring state does not participate in clock source selection, the processing unit does not switch a traced clock source back to the first clock source. This reduces a frequency of switching the clock source and improves network stability.

Figure 11:
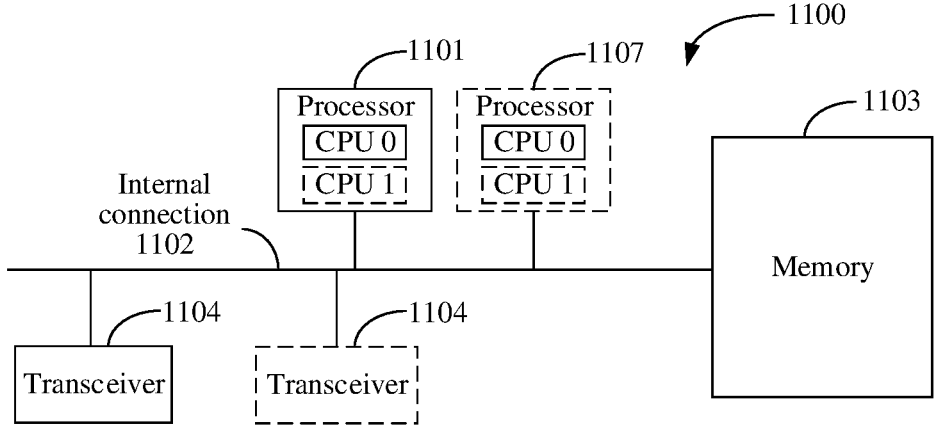
FIG. 11 is a schematic diagram of a structure of another clock source selection apparatus according to an embodiment of this application.

FIG. 11 is a schematic diagram of a clock source selection apparatus 1100 according to an embodiment of this application. The apparatus 1100 may be the first network device 101 in the network architecture 100 shown in FIG. 1, the first network device in the method 300 shown in FIG. 3, or the first network device in the method 600 shown in FIG. 6. The apparatus 1100 includes at least one processor 1101, an internal connection 1102, a memory 1103, and at least one transceiver 1104.

The apparatus 1100 is an apparatus of a hardware structure, and may be configured to implement functional modules in the apparatus 800 in FIG. 8. For example, a person skilled in the art may figure out that the processing unit 801 in the apparatus 800 shown in FIG. 8 may be implemented by the at least one processor 1101 by invoking code in the memory 1103, and the receiving unit 802 in the apparatus 800 shown in FIG. 8 may be implemented by the transceiver 1104.

Optionally, the apparatus 1100 may be further configured to implement a function of the first network device in the embodiment shown in FIG. 1, FIG. 3, or FIG. 6.

Optionally, the processor 1101 may be a general-purpose central processing unit (CPU), a network processor (NP), a microprocessor, an application-specific integrated circuit (ASIC), or one or more integrated circuits configured to control program execution of the solutions of this application.

The internal connection 1102 may include a path for transmitting information between the foregoing components. Optionally, the internal connection 1102 is a board, a bus, or the like.

The transceiver 1104 is configured to communicate with another device or a communication network.

The memory 1103 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disk, a Blu-ray disc, and the like), a magnetic disk storage medium or another magnetic storage device, or any other medium capable of carrying or storing expected program code in a form of an instruction or a data structure and capable of being accessed by a computer, but the memory 1103 is not limited thereto. The memory may exist independently, and is connected to the processor through the bus. The memory may alternatively be integrated with the processor.

The memory 1103 is configured to store application program code used for executing the solutions of this application, and the processor 1101 controls the execution. The processor 1101 is configured to execute the application program code stored in the memory 1103, and cooperate with the at least one transceiver 1104, so that the apparatus 1100 implements functions in the method in this patent.

In specific implementation, in an embodiment, the processor 1101 may include one or more CPUs such as a CPU 0 and a CPU 1 in FIG. 11.

In specific implementation, in an embodiment, the apparatus 1100 may include a plurality of processors, for example, the processor 1101 and a processor 1107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

Figure 12:
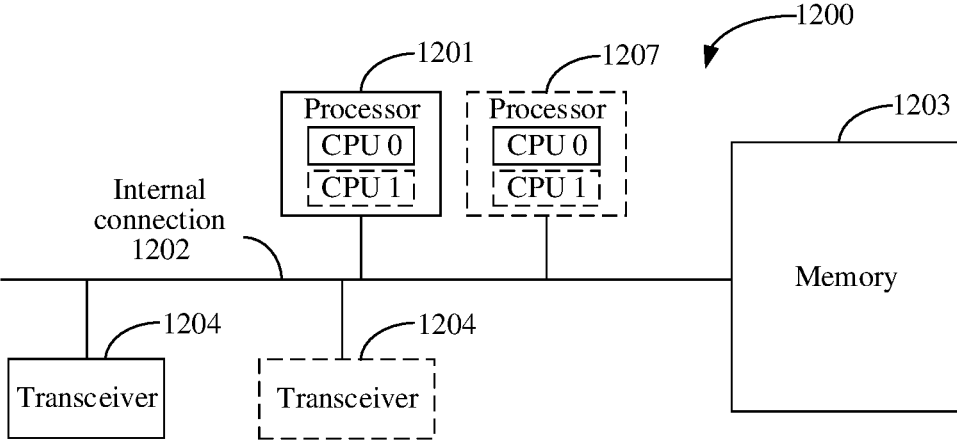
FIG. 12 is a schematic diagram of a structure of another clock source selection apparatus according to an embodiment of this application.

FIG. 12 is a schematic diagram of a clock source selection apparatus 1200 according to an embodiment of this application. The apparatus 1200 may be the second network device 102 in the network architecture 100 shown in FIG. 1, the second network device in the method 300 shown in FIG. 3, or the second network device in the method 600 shown in FIG. 6. The apparatus 1200 includes at least one processor 1201, an internal connection 1202, a memory 1203, and at least one transceiver 1204.

The apparatus 1200 is an apparatus of a hardware structure, and may be configured to implement functional modules in the apparatus 900 in FIG. 9. For example, a person skilled in the art may figure out that the processing unit 901 in the apparatus 900 shown in FIG. 9 may be implemented by the at least one processor 1201 by invoking code in the memory 1203, and the sending unit 902 in the apparatus 900 shown in FIG. 9 may be implemented by the transceiver 1204.

Optionally, the apparatus 1200 may be further configured to implement a function of the second network device in the embodiment shown in FIG. 1, FIG. 3, or FIG. 6.

Optionally, the processor 1201 may be a general-purpose central processing unit (CPU), a network processor (NP), a microprocessor, an application-specific integrated circuit (ASIC), or one or more integrated circuits configured to control program execution of the solutions of this application.

The internal connection 1202 may include a path for transmitting information between the foregoing components. Optionally, the internal connection 1202 is a board, a bus, or the like.

The transceiver 1204 is configured to communicate with another device or a communications network.

The memory 1203 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disk, a Blu-ray disc, and the like), a magnetic disk storage medium or another magnetic storage device, or any other medium capable of carrying or storing expected program code in a form of an instruction or a data structure and capable of being accessed by a computer, but the memory 1203 is not limited thereto. The memory may exist independently, and is connected to the processor through the bus. The memory may alternatively be integrated with the processor.

The memory 1203 is configured to store application program code for executing the solutions of this application, and the processor 1201 controls the execution. The processor 1201 is configured to execute the application program code stored in the memory 1203, and cooperate with the at least one transceiver 1204, so that the apparatus 1200 implements functions in the method in this patent.

In specific implementation, in an embodiment, the processor 1201 may include one or more CPUs such as a CPU 0 and a CPU 1 in FIG. 12.

In specific implementation, in an embodiment, the apparatus 1200 may include a plurality of processors, for example, the processor 1201 and a processor 1207 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

Figure 13:
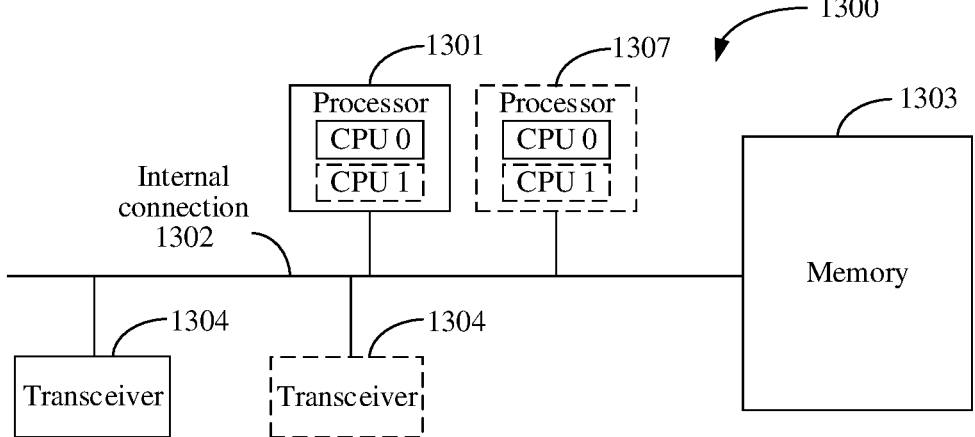
FIG. 13 is a schematic diagram of a structure of another clock source selection apparatus according to an embodiment of this application.

FIG. 13 is a schematic diagram of a clock source selection apparatus 1300 according to an embodiment of this application. The apparatus 1300 may be the first network device 201 in the network architecture 200 shown in FIG. 2, or the first network device in the method 700 shown in FIG. 7. The apparatus 1300 includes at least one processor 1301, an internal connection 1302, a memory 1303, and at least one transceiver 1304.

The apparatus 1300 is an apparatus of a hardware structure, and may be configured to implement functional modules in the apparatus woo in FIG. 10. For example, a person skilled in the art may figure out that the processing unit 1001 in the apparatus woo shown in FIG. 10 may be implemented by the at least one processor 1301 by invoking code in the memory 1303.

Optionally, the apparatus 1300 may be further configured to implement a function of the first network device in the embodiment shown in FIG. 2 or FIG. 7.

Optionally, the processor 1301 may be a general-purpose central processing unit (CPU), a network processor (NP), a microprocessor, an application-specific integrated circuit (ASIC), or one or more integrated circuits configured to control program execution of the solutions of this application.

The internal connection 1302 may include a path for transmitting information between the foregoing components. Optionally, the internal connection 1302 is a board, a bus, or the like.

The transceiver 1304 is configured to communicate with another device or a communication network.

The memory 1303 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disk, a Blu-ray disc, and the like), a magnetic disk storage medium or another magnetic storage device, or any other medium capable of carrying or storing expected program code in a form of an instruction or a data structure and capable of being accessed by a computer, but the memory 1303 is not limited thereto. The memory may exist independently, and is connected to the processor through the bus. The memory may alternatively be integrated with the processor.

The memory 1303 is configured to store application program code for executing the solutions in this application, and the processor 1301 controls the execution. The processor 1301 is configured to execute the application program code stored in the memory 1303, and cooperate with the at least one transceiver 1304, so that the apparatus 1300 implements functions in the method in this patent.

In a specific implementation, in an embodiment, the processor 1301 may include one or more CPUs, for example, a CPU 0 and a CPU 1 in FIG. 13.

In a specific implementation, in an embodiment, the apparatus 1300 may include a plurality of processors, for example, the processor 1301 and a processor 1307 in FIG. 13. Each of the processors may be a single-core (single-CPU) processor, or may be a multi-core (multi-CPU) processor. The processor herein may be one or more devices, circuits, and/or processing cores configured to process data (for example, computer program instructions).

Figure 14:
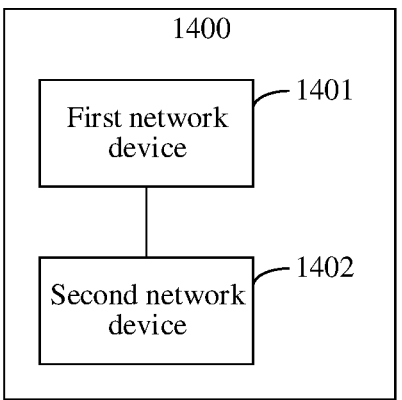
FIG. 14 is a schematic diagram of a structure of a clock source selection system according to an embodiment of this application.

Refer to FIG. 14. An embodiment of this application provides a clock source selection system 1400, including the apparatus 800 shown in FIG. 8 and the apparatus 900 shown in FIG. 9, or including the apparatus 1100 shown in FIG. 11 and the apparatus 1200 shown in FIG. 12.

Refer to FIG. 14. The apparatus 800 shown in FIG. 8 or the apparatus 1100 shown in FIG. 11 may be a first network device 1401, and the apparatus 900 shown in FIG. 9 or the apparatus 1200 shown in FIG. 12 may be a second network device 1402.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A method, comprising:

performing, by a first network device, a trace of a clock of a second network device based on a second parameter value being inferior to a third parameter value according to a comparison operation configured in the first network device, wherein the second parameter value corresponds to a synchronization source selection parameter of the first network device and the third parameter value corresponds to a synchronization source selection parameter of the second network device; and after the first network device performs the trace of the clock of the second network device, in response to the first network device not being able to perform another trace of the clock of the second network device, modifying, by the first network device, the second parameter value corresponding to the synchronization source selection parameter of the first network device to a first parameter value, wherein the first parameter value is superior to the third parameter value corresponding to the synchronization source selection parameter of the second network device according to the comparison operation configured in the first network device.

2. The method according to claim 1, wherein the synchronization source selection parameter of the first network device comprises a local priority (localPriority) parameter of the first network device, and the first parameter value comprises a first priority parameter value; and wherein modifying, by the first network device, the second parameter value corresponding to the synchronization source selection parameter of the first network device to the first parameter value comprises:

modifying, by the first network device, a second priority parameter value corresponding to the localPriority parameter of the first network device to the first priority parameter value.

3. The method according to claim 2, wherein the second priority parameter value is inferior to a priority parameter value corresponding to a localPriority parameter of a first port according to the comparison operation configured in the first network device, and the first port is a port of the first network device that is configured for communicating with the second network device.

4. The method according to claim 2, wherein the first priority parameter value is superior to the priority parameter value corresponding to the localPriority parameter of a first port according to the comparison operation configured in the first network device, and the first port is a port of the first network device that is configured for communicating with the second network device.

5. The method according to claim 2, wherein the second priority parameter value is equal to a priority parameter value corresponding to a localPriority parameter of the second network device.

6. The method according to claim 2, further comprising:

after modifying, by the first network device, the second parameter value corresponding to the synchronization source selection parameter of the first network device to the first parameter value, selecting, by the first network device, a synchronization tracing source based on the first priority parameter value.

7. The method according to claim 6, wherein selecting, by the first network device, the synchronization tracing source based on the first priority parameter value comprises:

when receiving a packet from the second network device through a first port, comparing, by the first network device, the first priority parameter value with a priority parameter value corresponding to the localPriority parameter of the first port, wherein the first port is on the first network device and is configured for communicating with the second network device; and when determining by comparison that the first priority parameter value is superior to the priority parameter value corresponding to the localPriority parameter of the first port, selecting, by the first network device, the first network device as the synchronization tracing source.

8. The method according to claim 1, wherein the synchronization source selection parameter of the first network device comprises a clock quality parameter of the first network device, and the first parameter value comprises a first clock quality parameter value; and wherein modifying, by the first network device, the second parameter value corresponding to the synchronization source selection parameter of the first network device to the first parameter value comprises:

modifying, by the first network device, a clock quality parameter value corresponding to the clock quality parameter of the first network device to the first clock quality parameter value.

9. The method according to claim 8, wherein the clock quality parameter of the first network device comprises one or more of a clock class, clock accuracy, or an offset scaled log variance of the first network device.

10. The method according to claim 8, further comprising:

selecting, by the first network device, a synchronization tracing source based on the first clock quality parameter value.

11. An apparatus, comprising:

at least one processor; and a non-transitory computer readable storage medium storing instructions that are executable by the at least one processor, the instructions including instructions for:

performing a trace of a clock of a second network device based on a second parameter value being inferior to a third parameter value according to a comparison operation configured in the apparatus, wherein the second parameter value corresponds to a synchronization source selection parameter of a first network device and the third parameter value corresponds to a synchronization source selection parameter of the second network device; and after performing the trace of the clock of the second network device, in response to the apparatus not being able to perform another trace of the clock of the second network device, modifying the second parameter value corresponding to a synchronization source selection parameter of the apparatus to a first parameter value, wherein the first parameter value is superior to the third parameter value corresponding to the synchronization source selection parameter of the second network device according to the compari-
son operation configured in the apparatus.

12. The apparatus according to claim 11, wherein the
synchronization source selection parameter of the apparatus
comprises a local priority (localPriority) parameter of the
apparatus, and the first parameter value comprises a first
priority parameter value; and wherein the instructions include instructions for modify-
ing a second priority parameter value corresponding to
the localPriority parameter of the apparatus to the first
priority parameter value.

13. The apparatus according to claim 12, wherein the
second priority parameter value is inferior to a priority
parameter value corresponding to a localPriority parameter
of a first port according to the comparison operation con-
figured in the apparatus, and the first port is a port of the
apparatus that is configured for communicating with the
second network device.

14. The apparatus according to claim 12, wherein the first
priority parameter value is superior to a priority parameter
value corresponding to a localPriority parameter of a first
port according to the comparison operation configured in the
apparatus, and the first port is a port of the apparatus that is
configured for communicating with the second network
device.

15. The apparatus according to claim 12, wherein the
second priority parameter value is equal to a priority param-
eter value corresponding to a localPriority parameter of the
second network device.

16. The apparatus according to claim 12, wherein the
instructions further include instructions for:

after modifying the second parameter value correspond-
ing to the synchronization source selection parameter of the apparatus to the first parameter value, selecting
a synchronization tracing source based on the first
priority parameter value.

17. The apparatus according to claim 16, wherein the
instructions further include instructions for:

when receiving a packet from the second network device
through a first port, comparing the first priority param-
eter value with a priority parameter value correspond-
ing to a localPriority parameter of the first port, wherein
the first port is a port of the apparatus that is configured
for communicating with the second network device;
and when determining by comparison that the first priority
parameter value is superior to the priority parameter
value corresponding to the localPriority parameter of
the first port, selecting the apparatus as the synchroni-
zation tracing source.

18. The apparatus according to claim 11, wherein the
synchronization source selection parameter of the apparatus
comprises a clock quality parameter of the apparatus, and
the first parameter value comprises a first clock quality
parameter value; and wherein the instructions further include instructions for
modifying a clock quality parameter value correspond-
ing to the clock quality parameter of the apparatus to
the first clock quality parameter value.

19. The apparatus according to claim 18, wherein the
clock quality parameter of the apparatus comprises one or
more of a clock class, clock accuracy, or an offset scaled log
variance of the apparatus.

20. The apparatus according to claim 18, wherein the
instructions further include instructions for:

selecting a synchronization tracing source based on the
first clock quality parameter value.

* * * * *